(12) United States Patent
Abe

(10) Patent No.: US 11,092,423 B2
(45) Date of Patent: Aug. 17, 2021

(54) MEASURING DEVICE AND MEASURING SYSTEM

(71) Applicant: MITUTOYO CORPORATION, Kanagawa (JP)

(72) Inventor: Shinsaku Abe, Iwamizawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 174 days.

(21) Appl. No.: 16/200,821

(22) Filed: Nov. 27, 2018

(65) Prior Publication Data
US 2019/0162516 A1 May 30, 2019

(30) Foreign Application Priority Data

Nov. 29, 2017 (JP) .............................. JP2017-229446
Nov. 29, 2017 (JP) .............................. JP2017-229447
Nov. 29, 2017 (JP) .............................. JP2017-229448
Dec. 5, 2017 (JP) .............................. JP2017-233259

(51) Int. Cl.
*G01B 5/207* (2006.01)
*G01B 3/22* (2006.01)

(52) U.S. Cl.
CPC .............. *G01B 5/207* (2013.01); *G01B 3/22* (2013.01)

(58) Field of Classification Search
CPC . G01B 5/207; G01B 5/20; G01B 5/28; G01B 5/201; G01B 5/252; G01B 5/285
USPC .................................................. 33/553, 554
See application file for complete search history.

(56) References Cited

U.S. PATENT DOCUMENTS

| 3,125,811 | A | * | 3/1964 | Pierce et al. | G01B 7/282 33/550 |
| 3,274,693 | A | * | 9/1966 | Witzke | G01B 7/282 33/558 |
| 3,400,463 | A | * | 9/1968 | Barringer | G01B 7/34 33/546 |
| 3,942,253 | A | * | 3/1976 | Gebel | G01B 5/201 33/555.1 |
| 4,593,473 | A | * | 6/1986 | Shimomura | G01D 3/063 33/551 |
| 4,729,174 | A | * | 3/1988 | Caron | G01B 7/293 33/228 |
| 5,189,798 | A | * | 3/1993 | La Force | G01B 5/25 33/1 Q |

(Continued)

FOREIGN PATENT DOCUMENTS

JP H10-103901 A 4/1998

*Primary Examiner* — Christopher W Fulton
(74) *Attorney, Agent, or Firm* — Oliff PLC

(57) ABSTRACT

The measuring device according to the present invention includes: a measuring element that contacts with an object to be measured; a detector that detects a displacement amount of the measuring element in a process in which the measuring element slides relatively in a certain direction on a surface of the object to be measured during time from a measurement start to a measurement end; a storage unit; a data collecting unit that acquires the displacement amount detected by the detector in a predetermined cycle and causes the storage unit to successively store the displacement amount; a display unit that can perform graphical displaying; and a display controller that causes the display unit to display predetermined information on the basis of a displacement amount for each predetermined cycle.

14 Claims, 24 Drawing Sheets

(56) References Cited

U.S. PATENT DOCUMENTS

| | | | | |
|---|---|---|---|---|
| 5,205,046 A | * | 4/1993 | Barnett | G01B 5/285 |
| | | | | 33/533 |
| 5,979,069 A | | 11/1999 | Hayashida et al. | |
| 6,151,791 A | * | 11/2000 | Shimazutsu | B21B 38/12 |
| | | | | 33/533 |
| 6,954,991 B2 | * | 10/2005 | Akatsuka | G01B 11/2408 |
| | | | | 33/549 |
| 2009/0106995 A1 | * | 4/2009 | Zhang | G01B 5/20 |
| | | | | 33/533 |
| 2013/0055579 A1 | * | 3/2013 | Hayashi | G01B 3/205 |
| | | | | 33/784 |
| 2013/0247403 A1 | * | 9/2013 | Hayashida | G01D 7/00 |
| | | | | 33/505 |

* cited by examiner

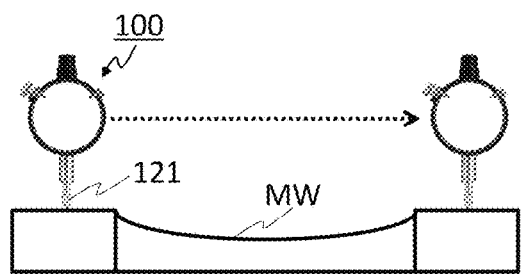
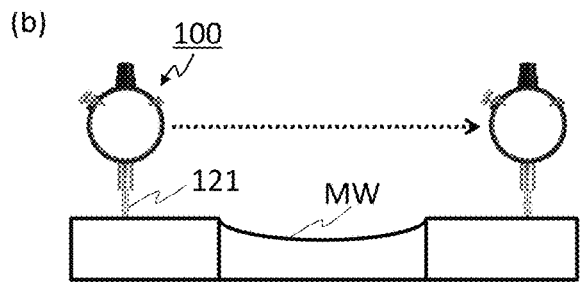
FIG.8A    FIG.8B
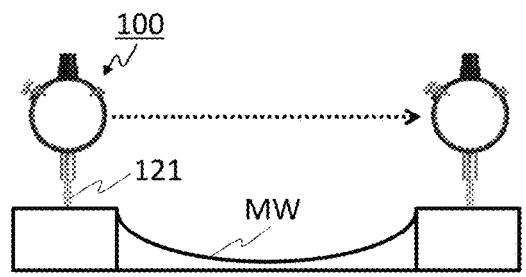
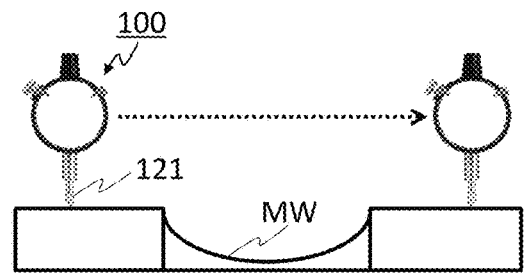
FIG.8C    FIG.8D
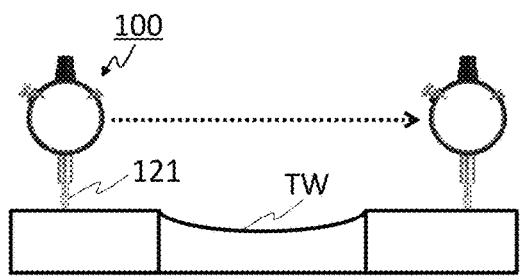
FIG.8E

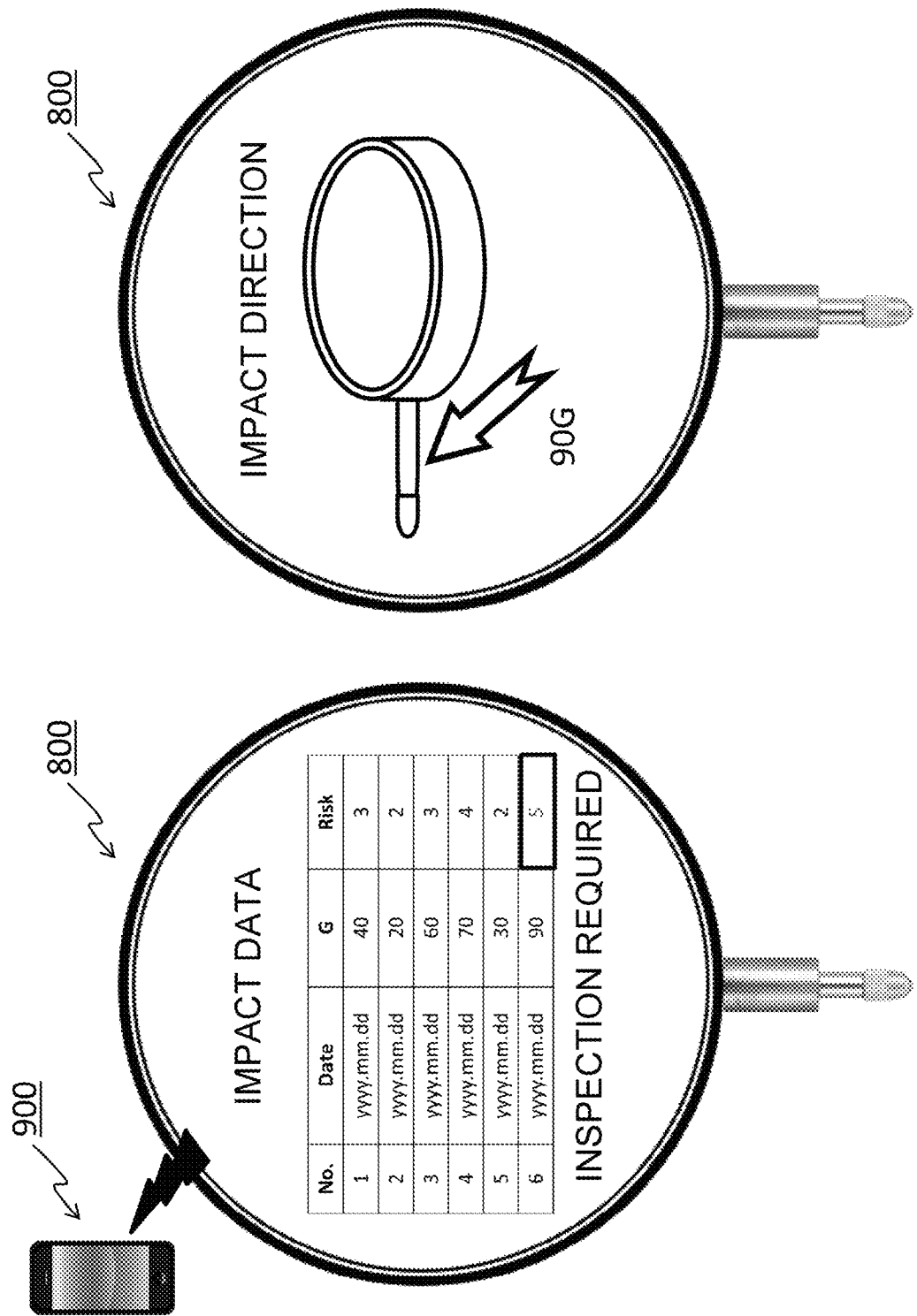

MEASURING DEVICE AND MEASURING SYSTEM

CROSS-REFERENCE TO RELATED APPLICATION

This non-provisional application claims priority under 35 U.S.C. § 119(a) from Japanese Patent Application No. 2017-229446, filed on Nov. 29, 2017, Japanese Patent Application No. 2017-229447, filed on Nov. 29, 2017, Japanese Patent Application No. 2017-229448, filed on Nov. 29, 2017, and Japanese Patent Application No. 2017-233259, filed on Dec. 5, 2017, the entire contents of which are incorporated herein by reference.

BACKGROUND

Technical Field

The present invention relates to a measuring device and a measuring system capable of storing measurement data.

Background Art

A dial gauge is known as one of measuring devices for performing comparative measurement. In dial gauges, there is a general type that measures a displacement amount of linear motion of a spindle provided with a measuring element at the tip end thereof, and also is a type that measures a displacement amount of oscillation of a lever-shaped measuring element (lever type dial gauge).

In addition to the way of classification as described above, dial gauges can be classified according to display formats of measurement results. Specifically, there is a dial gauge of a pointer type that displays a displacement amount by a rotation angle of the pointer, and a digital type dial gauge that digitally displays a displacement amount (see, for example, JP 10-103901 A).

SUMMARY OF THE INVENTION

Problems to be Solved by the Invention

In conventional dial gauges, for example, measurement for knowing the presence or absence of runout of a spindle or the like performed for centering, measurement for finding the rough magnitude of a displacement amount, measurement for making a pass and fail judgment by a limit value, or the like can be performed easily and promptly. However, in the case of measurement for grasping the shape of an object to be measured such as roundness, flatness, or straightness, it is necessary to read in detail the trend of the displacement amount in the process of relatively sliding a measuring element on a surface of the object to be measured in a certain direction. Therefore, it is necessary to slowly slide, and it takes time to measure.

Also, since the displacement amount displayed on the dial gauge fluctuates by sliding of the measuring element, when it is desired to correctly grasp the shape of the object to be measured or when it is desired to use measurement results later, sliding should be stopped successively so that a displacement amount is checked or recorded. Therefore, measurement takes further time.

An object of the present invention is to provide a measuring device and a measuring system capable of quickly measuring and with which a measurement result can be easily utilized, when it is desired to grasp a shape of an object to be measured from the trend of a displacement amount of a measuring element in a process in which the measuring element is slid on a surface of the object to be measured.

Means for Solving the Problems (1) A measuring device according to the present invention includes: a measuring element that contacts with an object to be measured; a detector that detects a displacement amount of the measuring element in a process in which the measuring element slides relatively in a certain direction on a surface of the object to be measured during time from a measurement start to a measurement end; a storage unit; a data collecting unit that acquires the displacement amount detected by the detector in a predetermined cycle and causes the storage unit to successively store the displacement amount; a display unit that can perform graphical displaying; and a display controller that causes the display unit to display predetermined information based on the displacement amount for each predetermined cycle.

The storage unit successively stores the displacement amount detected by the detector in this way, so that it is not necessary to read the displacement amount during measurement or to perform recording operation. Therefore, measurement can be performed promptly. Since the measurement result is stored in the storage unit, the measurement result can be easily used. Further, a display unit capable of graphic displaying is adopted, so that various information can be flexibly displayed.

(2) The display controller may cause the display unit to display the displacement amount for each predetermined cycle in the format of a graph showing a position dependent change of the displacement amount.

The measurement result is displayed in the graph format, it is possible to easily grasp a feature of the object to be measured, such as the maximum value, the minimum value, the number of peaks and bottoms.

(3) The graph may be expanded each time the displacement amount is acquired in a predetermined cycle by the data collecting unit.

As a result, the shape of the object to be measured can be grasped in real time during measurement.

(4) The storage unit may store measurement data of plural times considering the displacement amount for each predetermined cycle stored in the storage unit from the measurement start to the measurement end as measurement data of one time, and the display controller may cause the display unit to display the graph for each piece of measurement data of plural times in association.

(5) Examples of the measurement data of plural times include, for example, data obtained by performing a measurement of plural times in a predetermined procedure.

When it is desired to grasp the three-dimensional shape, for example, when it is desired to measure the flatness, first, measurement is sequentially performed for each of four sides of a quadrangle defined on a plane. Then, the display controller causes the display unit to perform three-dimensional graphic display of the obtained four pieces of measurement data. As a result, the flatness can be visually grasped.

(6) The measurement data of plural times may be used as reference measurement data and comparison measurement data to be compared with the reference measurement data, and the display controller may superimpose a graph of the reference measurement data and a graph of the comparison measurement data and cause the display unit to display the superimposed graph.

(7) The display controller may cause the display unit to display a graph showing a position dependent change of a difference between the reference measurement data and the comparison measurement data.

When the reference measurement data is used as measurement data of a master workpiece and the comparison measurement data is used as measurement data of an inspection target workpiece to be compared with the master workpiece, according to the present invention, it is possible to visually grasp the degree of difference of the state of the inspection target workpiece from the master workpiece.

(8) The storage unit may store measurement data of plural times considering the displacement amount for each predetermined cycle stored in the storage unit from the measurement start to the measurement end as measurement data of one time, and use the measurement data of plural times as plurality of pieces of reference measurement data being measurement data for each of a plurality of reference objects to be measured and comparison measurement data being measurement data of an object to be measured to be compared with each reference object to be measured, and the display controller may compare a change in a displacement amount in the comparison measurement data and a change in a displacement amount in each reference measurement data with predetermined similarity as a scale to specify the reference object to be measured to which the object to be measured is most similar, and cause the display unit to display information indicating the specified reference object to be measured.

When each reference object to be measured is representative of the type of the object to be measured, according to the present invention, it is possible to easily specify which type has the highest possibility of being a type to which the object to be measured belongs.

(9) A touch panel display may be adopted as the display unit so that the measurement start and the measurement end may be instructed by a touch input to a touch panel display.

This facilitates instruction input operation of the measurement start and the measurement end.

(10) The present invention is preferably applied to a spindle type dial gauge or lever type dial gauge.

(11) The detector may detect the displacement amount of the measuring element in an inspection target section of the object to be measured, the storage unit may store in advance the displacement amount for each predetermined cycle in first measurement preliminarily performed in the inspection target section. When second measurement in the inspection target section is performed, the display controller may refer to the storage unit to cause the display unit to display a graph showing a position dependent change of the displacement amount in the inspection target section related to the first measurement, and search a position in the inspection target section that has the same displacement amount as the displacement amount acquired by the second measurement in the graph to cause the display unit to display the position in a predetermined manner.

(12) Specifically, for example, when an end point of the first measurement is a start point of the second measurement, the display controller may search a position in the inspection target section every time the displacement amount in the second measurement is acquired for each predetermined cycle, from a start point that is a specified position in a previous cycle, to a start point of the first measurement in the graph, to cause the display unit to display the position. When a start point of the first measurement is the start point of the second measurement, the display controller may search a position in the inspection target section every time the displacement amount in the second measurement is acquired for each predetermined cycle, from a start point that is a specified position in a previous cycle, to the end point of the first measurement in the graph, to cause the display unit to display the position.

As described above, after the first measurement for grasping the entire shape of the section as the detection target, when the second measurement is performed for specifying a portion to be processed, a current position of the measuring element in the second measurement is successively displayed on the graph showing the entire shape, so that it is possible to promptly and easily specify the position where the displacement amount is the peak or the bottom while referring to the unevenness of the graph.

(13) Even in the configuration of the present invention in which the current position of the measuring element in the second measurement is successively displayed on the graph showing the entire shape, application to a spindle type dial gauge or lever type dial gauge is preferable.

(14) The measuring device of the present invention may include: a plurality of measuring units each including a measuring element, a detector, a storage unit, a data collecting unit that starts processing of acquiring the displacement amount detected by the detector at the trigger of receipt of a measurement start instruction in a predetermined cycle and causing the storage unit to sequentially store the displacement amount, and ends the processing at the trigger of receipt of a measurement end instruction, and a providing unit that transmits the measurement result of the displacement amount for each cycle to a central unit at the trigger of receipt of a measurement result transmission instruction; and an integrating unit including a central storage unit, an acquisition unit that transmits the measurement start instruction and the measurement end instruction to the measuring units so that the measuring units perform measurement in synchronization, transmits the measurement result transmission instruction to the measuring units later than transmission of the measurement end instruction, receives the measurement result from the measuring units, and causes the storage unit to store the measurement result, a display unit, and a display controller that causes the display unit to display predetermined information based on the measurement result of the measuring units.

The measuring system is configured in this way, it is possible to promptly and easily collect the results of measurement performed simultaneously by the plurality of measuring units to the central unit, and to display predetermined information based on each measurement results in the central unit.

(15) The central unit may be integrated with one of the measuring units. By this integration, the system can be made compact.

(16) Each measuring unit may be daisy-chained to the central unit. The daisy chain connection is adopted, so that the distance between the central unit and the measuring unit that is not the closest to the central unit can be made longer than that in the case of star connection.

(17) The display controller may cause the display unit to display aggregate information obtained by aggregating the measurement results of the measuring units.

(18) The central storage unit may store in advance the aggregate information obtained by aggregating the measurement results by the measuring units, the measurement units collected for each of the plurality of reference objects to be measured, and the display controller may compare the aggregate information obtained by the measurement performed for the object to be measured and the aggregate information of each of the plurality of reference objects to be measured stored in the central storage unit, with predetermined similarity as a scale, to specify a reference object to be measured that is most similar to the object to be measured and cause the display unit to display information indicating the specified reference objects to be measured.

When each reference object to be measured is representative of the type of the object to be measured, according to the present invention, it is possible to easily specify which type has the highest possibility of being a type to which the object to be measured belongs.

(19) The measuring unit of the present invention may be configured with a spindle type dial gauge or lever type dial gauge as a base.

(20) The measuring device of the present invention may further include an impact detector that detects impact, and a writing unit that writes a content of the impact together with a detection timing into the storage unit each time the impact detector detects impact.

With such a configuration, the content of the impact is stored in the storage unit and remained as a history each time an impact is applied to the measuring device. Therefore, the user can grasp the history information by referring to the storage unit by an arbitrary method.

(21) The measuring device may further include a risk database stored with a relationship between the content of the impact and a predetermined risk value indicating the magnitude of the risk of occurrence of an abnormality, and when the content of the impact detected by the impact detector is written in the storage unit, the writing unit may refer to the risk database and write the content together with a risk value corresponding to the content of the impact detected by the impact detector.

This allows the user to refer to the storage unit by an arbitrary method to grasp the risk due to the impact that the measuring device has temporarily or cumulatively received.

(22) The measuring device may further include a notification unit that refers to the storage unit at predetermined opportunity, and when the risk value corresponding to the impact detected by the impact detector exceeds a predetermined threshold, outputs predetermined warning information, and the display unit may display the warning information output by the notification unit in a predetermined form.

(23) The notification unit may output predetermined warning information when accumulation of risk values corresponding to each impact detected by the impact detector exceeds a predetermined threshold.

(24) When the number of impacts detected by the impact detector exceeds a predetermined threshold, the notification unit may output predetermined warning information.

In this manner, the measuring device is configured such that a warning is issued to the user in accordance with the set degree of risk, it is possible for the user to easily grasp the abnormality and cope with the abnormality promptly.

(25) The display unit may be provided outside the measuring device, and the notification unit may provide the predetermined warning information to the display unit via a predetermined communication unit.

As a result, even when the measuring device is used by remote control, for example, the warning information can be promptly provided to the user.

(26) The risk database may be provided outside the measuring device, and the writing unit may transmit and receive information to and from the risk database via a predetermined communication unit.

As a result, the risk database can be shared by a plurality of measuring devices, and there is no need to update the risk database for each measuring device.

(27) A measuring system may be composed of: the measuring device of the present invention; an analysis device that acquires data of a displacement amount for each predetermined cycle from the measuring device and performs predetermined analysis to obtain an analysis result; and an augmented reality device having an imaging unit and an augmented reality display unit, in the measuring system, the measuring device acquires marker information corresponding to the analysis result from the analysis device and causes the display unit to display a marker based on the marker information together with predetermined information, and when an image including the display unit of the measuring device is captured by the imaging unit, the augmented reality device may acquire an analysis result corresponding to a marker displayed together with predetermined information on the display unit, from the analysis device, and superimpose the analysis result on the image including the display unit of the measuring device captured by the imaging unit to cause the augmented reality display unit to display the superimposed image.

According to such a measuring system, variations in the display method of the measurement result can be increased. Since the analysis device is responsible for the analysis function, more flexible and advanced analysis can be performed than in a case where the analysis device itself has an analysis function.

BRIEF DESCRIPTION OF THE DRAWINGS

FIGS. 8A to 8D are diagrams for explaining a collection manner of reference measurement data; FIG. 8E is a diagram for explaining a collection manner of comparison measurement data;

FIGS. 24A and 24B are diagrams showing a specific example of an eleventh embodiment.

DETAILED DESCRIPTION OF THE EMBODIMENTS

Figure 1:
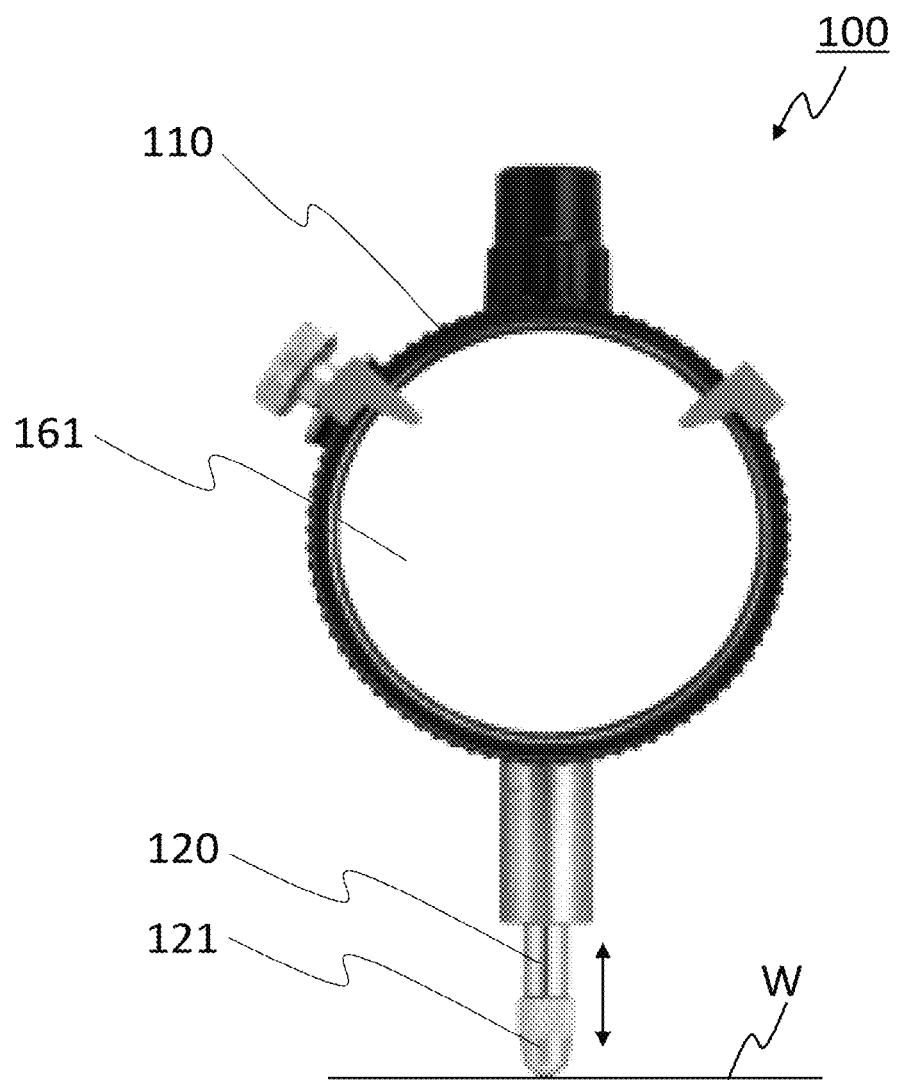
FIG. 1 is a diagram showing an example of appearance of a measuring device 100.

Hereinafter, embodiments of the measuring device of the present invention will be described below. In each embodiment, the same reference numerals are given to the constituent elements showing a similar function, and the explanation of the constituent elements once described is omitted as appropriate. In the following description, a case where the measuring device is a spindle type dial gauge will be described as an example. However, any device may be similarly applied as long as it is a device that measures displacement of a measuring element in the process of moving a measuring element on the surface of an object to be measured. For example, a dial gauge of another type such as lever type may be used, or a measuring device of other than a dial gauge may be used.

First Embodiment

Figure 2:
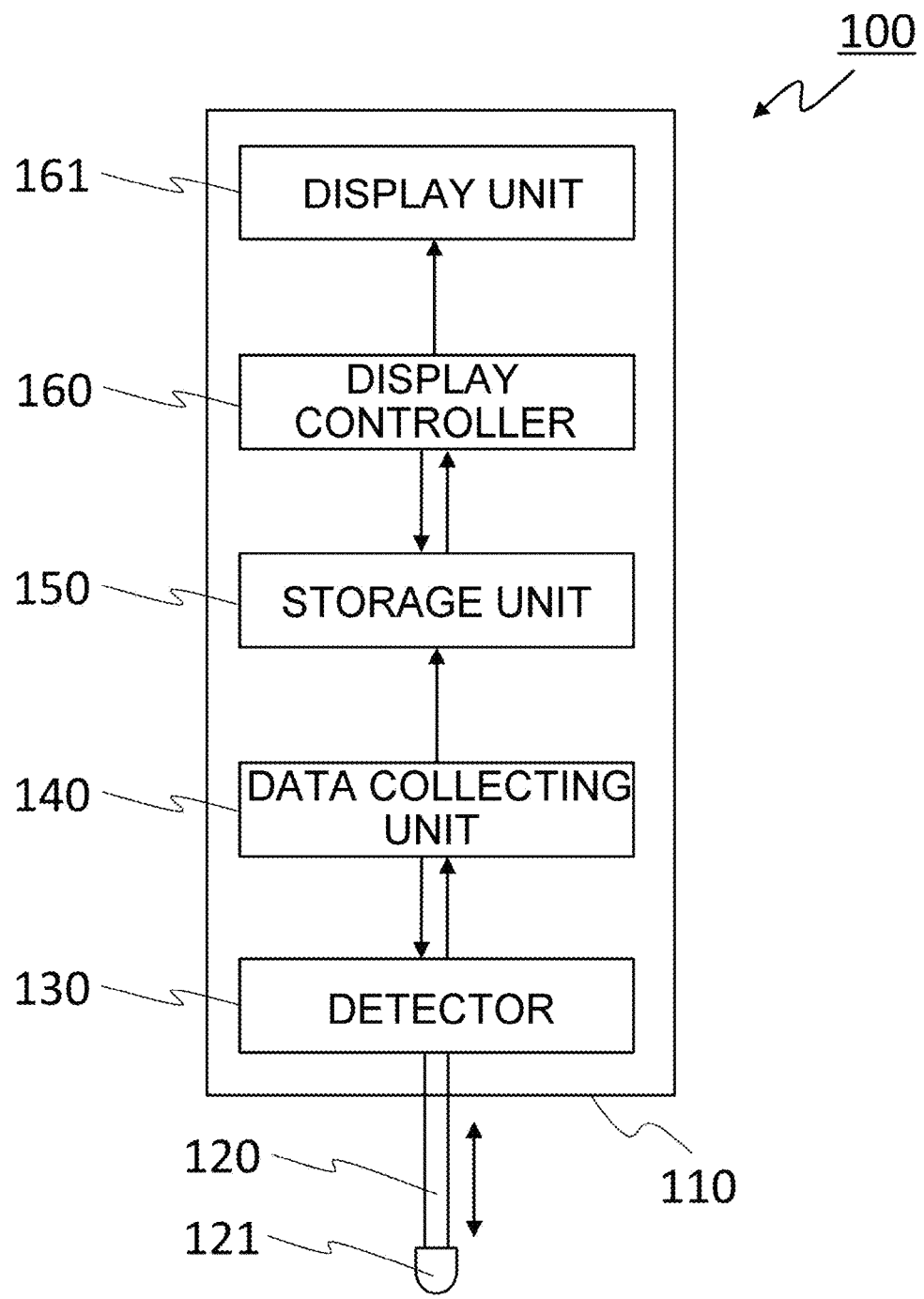
FIG. 2 is a functional block diagram of the measuring device 100.

FIG. 1 shows an example of appearance of a measuring device 100 of the present invention, and FIG. 2 shows an example of an internal configuration of a main body case 110. The measuring device 100 includes a main body case 110, a spindle 120, a measuring element 121, a detector 130, a data collecting unit 140, a storage unit 150, a display controller 160, and a display unit 161.

The spindle 120 is provided on the main body case 110 so as to be displaceable in the axial direction. At the tip end of the spindle 120, a measuring element 121 abutting against an object to be measured W is provided at the time of measurement, and the displacement of the measuring element 121 due to irregularities of the object to be measured W is reflected on the displacement of the spindle 120.

During the time from the measurement start to the measurement end, the detector 130 detects the displacement amount of the spindle 120 in a process in which the measuring element 121 relatively slides on the surface of the object to be measured W in a certain direction. An arbitrary method, such as a photoelectric type, a capacitive type, an electromagnetic type or the like, may be adopted as the detection method of the displacement amount as long as the displacement amount can be output as an electric signal.

The data collecting unit 140 acquires the displacement amount detected by the detector 130 in a predetermined cycle and causes an arbitrary storage unit 150 to successively store the displacement amount.

The display controller 160 causes the display unit 161 to display predetermined information based on the displacement amount for each predetermined cycle.

The function of the display controller 160 can be realized, for example, when the measuring device 100 includes the CPU and the CPU executes a program in which the function of the display controller 160 is described. In this case, advanced processing and analysis can be performed in accordance with the description contents of the program, and a result can be reflected on the display on the display unit 161.

A display capable of graphic displaying is adopted as the display unit 161, so that various information can be flexibly displayed. For example, the displacement amount for each predetermined cycle can be displayed in the format of a graph showing a position dependent change of the displacement amount.

Figure 3A:
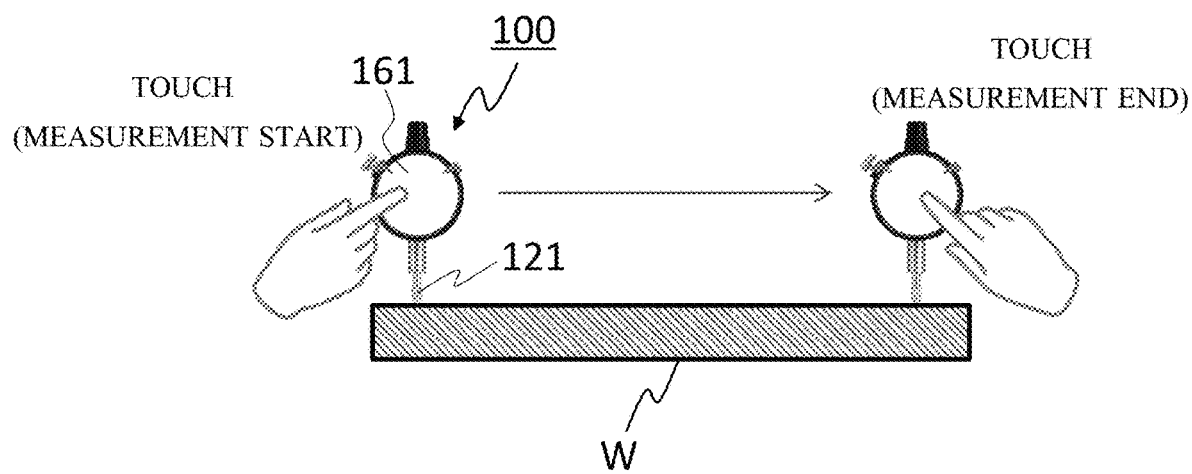
FIG. 3A is a schematic diagram for explaining a flow of measurement for grasping straightness of an object to be measured W.

A flow from the acquisition of the displacement amount to the display of the graph will be described with the measurement for grasping the straightness of the object to be measured W as an example. As shown in FIG. 3A, during the time from the measurement start to the measurement end, the detector 130 detects the displacement amount of the spindle 120 in a process in which the measuring element 121 slides on the surface of the object to be measured W from the left side to the right side in the drawing. For example, an input button or an input switch may be provided in the main body case 110 so that instruction input of the measurement start and the measurement end can be performed, or a touch panel display may be adopted as the display unit 161 so that the instruction input can be performed by a touch input.

Figure 3B:
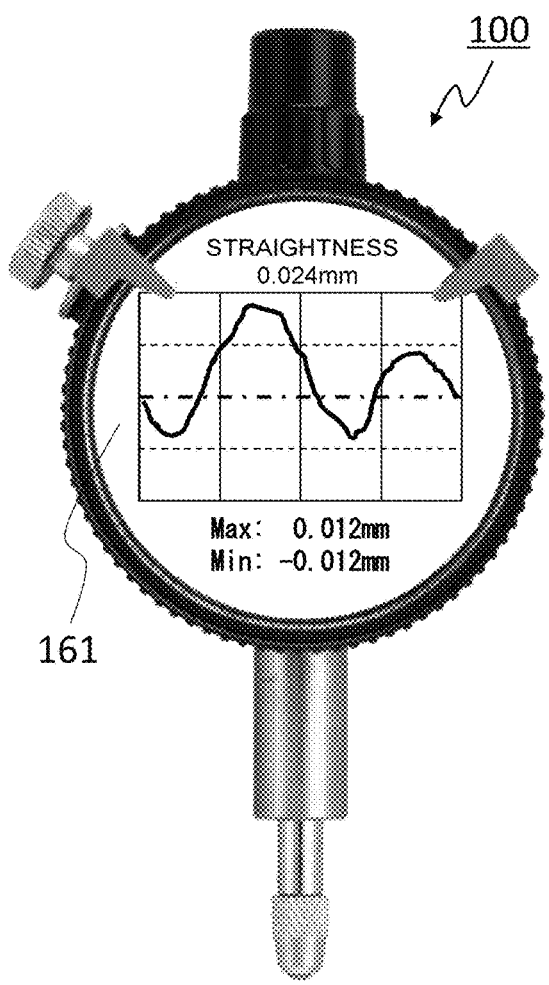
FIG. 3B is a diagram showing an example of a graph display of an acquired displacement amount.

The displacement amount detected by the detector 130 is acquired by the data collecting unit 140 in a predetermined cycle and sequentially stored in the storage unit 150. The display controller 160 causes the display unit 161 to display a graph as shown in FIG. 3B showing the position dependent change of the displacement amount. Together with displaying or instead of displaying the graph of the position dependent change of the displacement amount, the display unit 161 may display data analysis results such as a calculated value of the straightness, or a maximum value or minimum value of the displacement amount based on the measurement data of the position dependent change of the displacement amount.

Figure 4A:
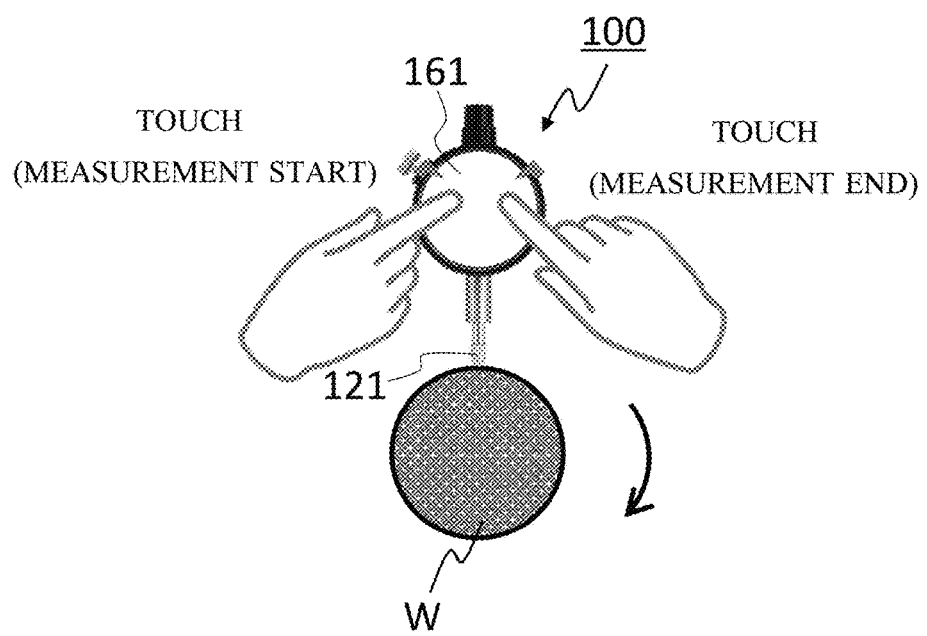
FIG. 4A is a schematic diagram for explaining a flow of measurement for grasping the roundness of an object to be measured W.
Figure 4B:
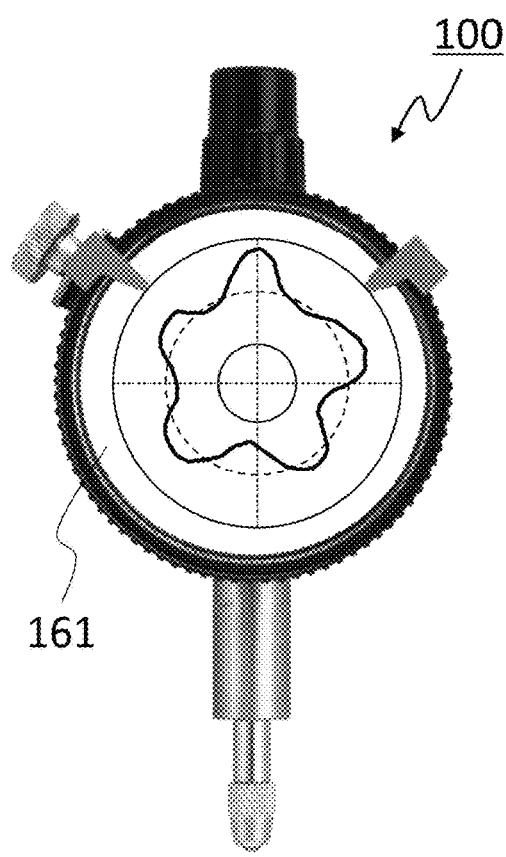
FIG. 4B is a diagram showing an example of a graph display of an acquired displacement amount.

For example, when the roundness in the object to be measured W as shown in FIG. 4A is grasped, during the time from the measurement start to the measurement end, in a process in which the measuring element 121 slides on the outer circumference of the object to be measured W, the data collecting unit 140 acquires the displacement amount detected by the detector 130 in a predetermined cycle, and the displacement amount is successively stored in the storage unit 150. Then, the display controller 160 causes the display unit 161 to display a graph as shown in FIG. 4B showing the position dependent change of the displacement amount in the outer circumference of the object to be measured W.

According to the measuring device 100 of the first embodiment described above, the storage unit successively stores the displacement amount detected by the detector, so that it is not necessary to read the displacement amount during measurement or to perform recording operation. Therefore, measurement can be performed promptly. Since the measurement result is stored in the storage unit, the measurement result can be easily used.

In displaying of the graph on the display unit 161, in the display controller 160, the graph may be expanded each time the displacement amount is acquired in a predetermined cycle by the data collecting unit 140.

As a result, the shape of the object to be measured W can be grasped in real time during measurement.

The measuring device 100 may further include a communication unit capable of communicating with an external device so as to notify the external device of a measurement result, measurement error occurrence information, excess information of the displacement limit value, excess information of the displacement limit frequency, or the like. The measuring device 100 may be configured to be able to instruct the measurement start and the measurement end from an external device.

Second Embodiment

In the measuring device 100 of the first embodiment, measurement data of plural times is stored in the storage unit 150 considering the displacement amount for each predetermined cycle stored in the storage unit 150 from the measurement start to the measurement end as measurement data of one time, and the display controller 160 may cause the display unit 161 to display the graph for each piece of measurement data of plural times in association. The method of correlating the graph for each piece of measurement data may be arbitrarily determined in accordance with the item to be measured.

Examples of the measurement data of plural times that the storage unit 150 stores include data obtained by performing a measurement of plural times in a predetermined procedure.

Figure 5A:
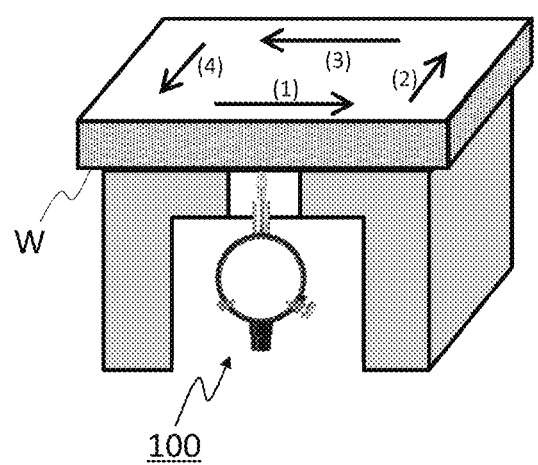
FIG. 5A is a schematic diagram for explaining a flow of measurement for grasping the flatness of an object to be measured W.
Figure 5B:
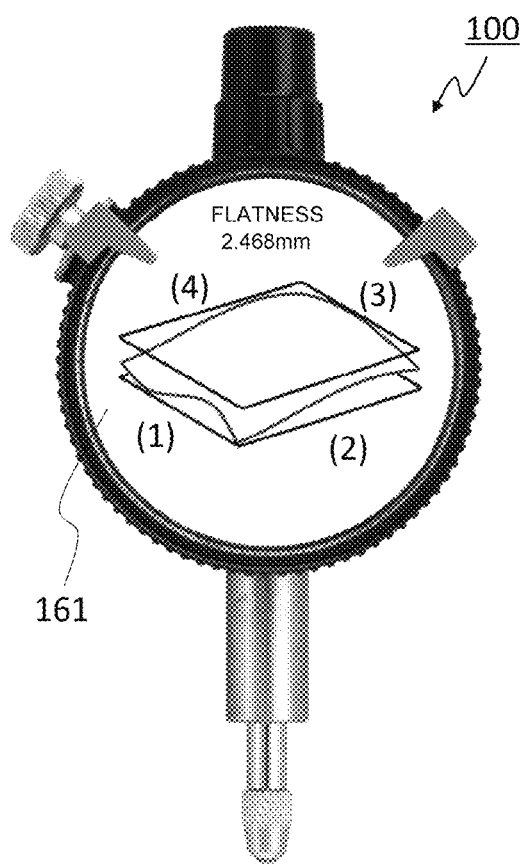
FIG. 5B is a diagram showing an example of a graphic display of flatness.

When it is desired to grasp the three-dimensional shape of the object to be measured W, for example, when it is desired to measure the flatness, first, as shown in FIG. 5A, measurement ((1) to (4)) is sequentially performed for each of four sides of a quadrangle defined on the plane. Then, the display controller 160 causes the display unit 161 to perform three-dimensional graphic display of the measurement data of four times obtained in this way, as shown in FIG. 5B. As a result, the flatness can be visually grasped. The display unit 161 may display calculated values of flatness together with the graphic display, or instead of the display.

When it is desired to measure the cylinder degree, for example, the measurement of the outer circumference of a cylinder is performed at a plurality of places where the position in the central axis direction is changed, and the display controller 160 causes the display unit 161 to perform the three-dimensional graphic display of the measurement data of plural times obtained by the measurement. As a result, the cylinder degree can be visually grasped.

Third Embodiment

Figure 6A:
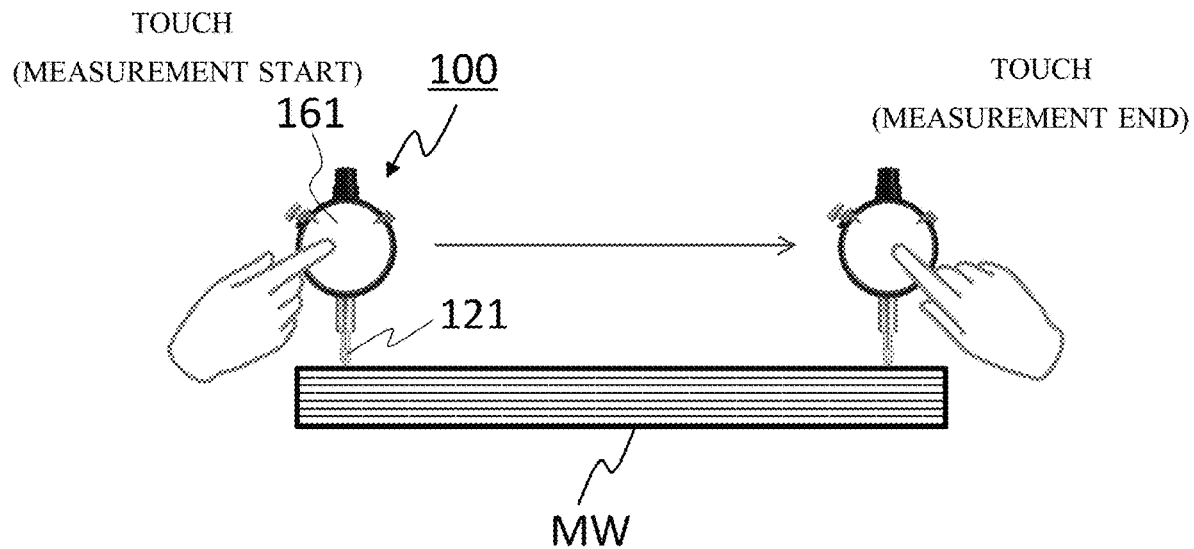
FIG. 6A is a diagram for explaining a collection manner of reference measurement data.
Figure 6B:
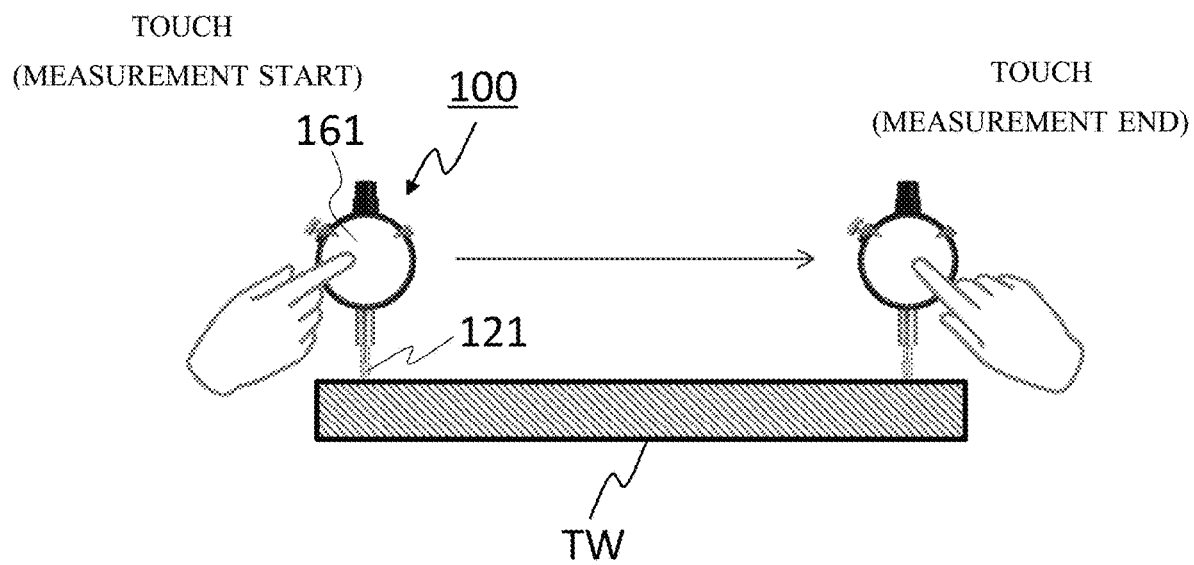
FIG. 6B is a diagram for explaining a collection manner of comparison measurement data.

In the measuring device 100 of the first embodiment, the storage unit 150 may store reference measurement data obtained by measuring a master workpiece MW as shown in FIG. 6A, and comparison measurement data obtained by measuring an inspection target workpiece TW as an object to be measured to be compared with the master workpiece MW as shown in FIG. 6B, and the display controller 160 may causes the display unit 161 to display these pieces of measurement data in association with each other.

Figure 7A:
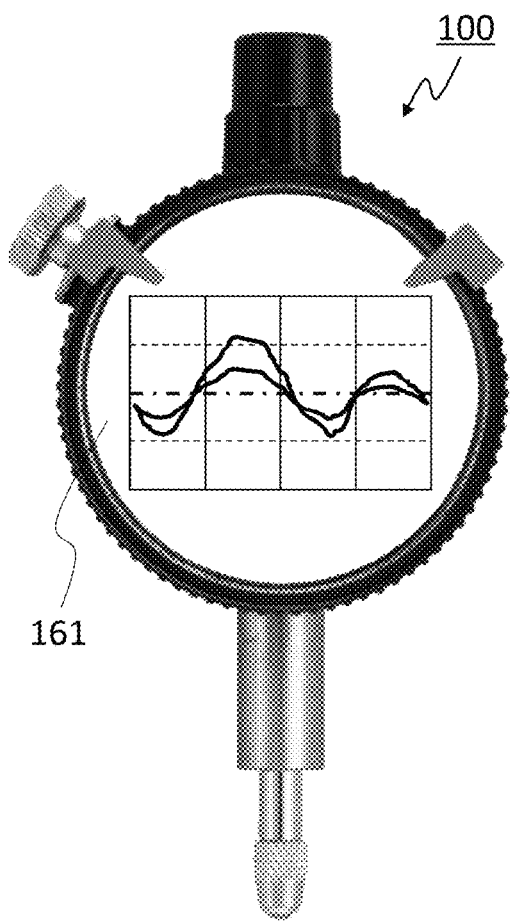
FIG. 7A is a diagram showing an example of a display showing a relationship between the reference measurement data and the comparison measurement data.
Figure 7B:
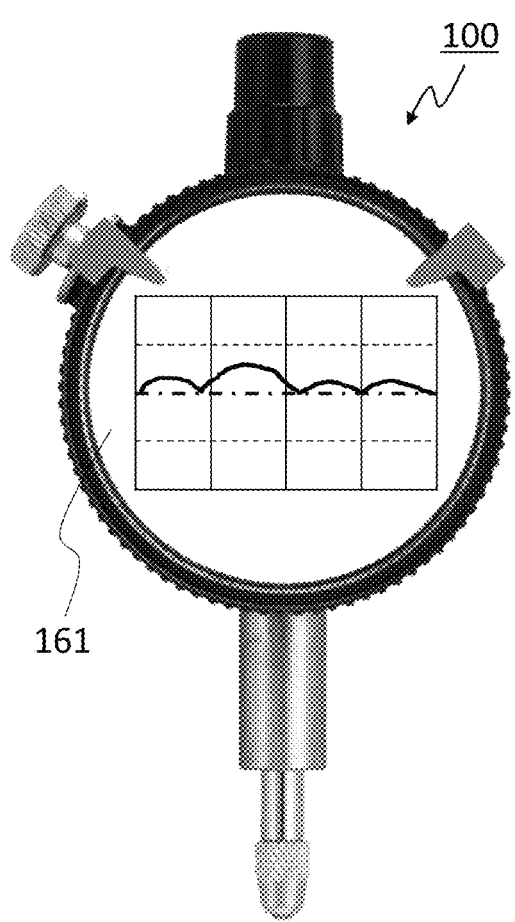
FIG. 7B is a diagram showing another example of a display showing a relationship between the reference measurement data and the comparison measurement data.

In this case, as a display form in which the reference measurement data and the comparison measurement data are associated with each other, for example, as shown in FIG. 7A, there is a form in which a graph of the reference measurement data and a graph of the comparison measurement data are superimposed and displayed. This can be used for comparison of the trend of displacement and identification of the portion where the difference in displacement is large. For example, as shown in FIG. 7B, a form may be adopted in which a graph is displayed showing a position dependent change of the difference between the reference measurement data and the comparison measurement data. Thus, it can be used for the pass and fail judgment as to whether the difference allowable value is satisfied.

When graphs for a plurality of pieces of measurement data are superimposed or when a graph of the difference is displayed, if the acquisition cycle of the displacement amount at the time of acquisition of each piece of measurement data and the sliding speeds of the measuring element are different, it is necessary to match each piece of measurement data when the superimposed display or the difference display is performed. Therefore, if possible, it is preferable that each piece of measurement data is acquired at the same acquisition cycle and with the same sliding speed. Matching of each piece of measurement data may be performed with different acquisition cycles or sliding speeds, for example, by a method of performing alignment at a feature point such as a peak or bottom point or the like, a method of performing best fit of contour or the like to perform alignment, a method of determining measurement lengths from the measurement start to the measurement end to be the same and forcibly aligning measurement results, or the like.

Fourth Embodiment

In the measuring device 100 according to the first embodiment, the storage unit 150 may store in advance a plurality pieces of reference measurement data being measurement data of each master workpiece MW obtained by measuring a plurality of master workpieces MW being a reference object to be measured, for example, as shown in FIGS. 8A to 8D, and comparison measurement data being measurement data of the inspection target workpiece TW obtained by measuring the inspection target workpiece TW being an object to be measured to be compared with each master workpiece MW, for example, as shown in FIG. 8E, and the display controller 160 may compare the change of the displacement amount in the comparison measurement data and the change of the displacement amount in each piece of the reference measurement data with predetermined similarity as a scale, to specify the master workpiece MW that is most similar to the inspection target workpiece TW from a plurality of (four in the example shown in FIGS. 8A to 8E) master workpieces MW, and causes the display unit 161 to display arbitrary information indicating the specified master workpiece MW in an arbitrary form.

As a result, when each reference object to be measured is representative of the type of the object to be measured, it is possible to easily specify which type has the highest possibility of being a type to which the object to be measured belongs.

If the acquisition cycle of the displacement amount at the time of acquisition of each piece of measurement data and the sliding speeds of the measuring element are different when a plurality of pieces of measurement data are compared, it is necessary to match each piece of measurement data at the time of comparison. Therefore, if possible, it is preferable that each piece of measurement data is acquired at the same acquisition cycle and the same sliding speed. Matching of each piece of measurement data may be performed with different acquisition cycles or sliding speeds, for example, by a method of performing alignment at a feature point such as a peak or bottom point or the like, a method of performing best fit of contour or the like to perform alignment, a method of determining measurement lengths from the measurement start to the measurement end to be the same and forcibly aligning measurement results, or the like.

Fifth Embodiment

When the function of the display controller 160 is realized by executing by the CPU the program in which the function of the display controller 160 is described, the program may be prepared in advance in the measuring device 100, or the measuring device 100 may include a communication unit for communicating with an external device and the program may be obtained as necessary in the form of receiving uploading from the external device or downloading from the external device or cloud.

Figure 9:
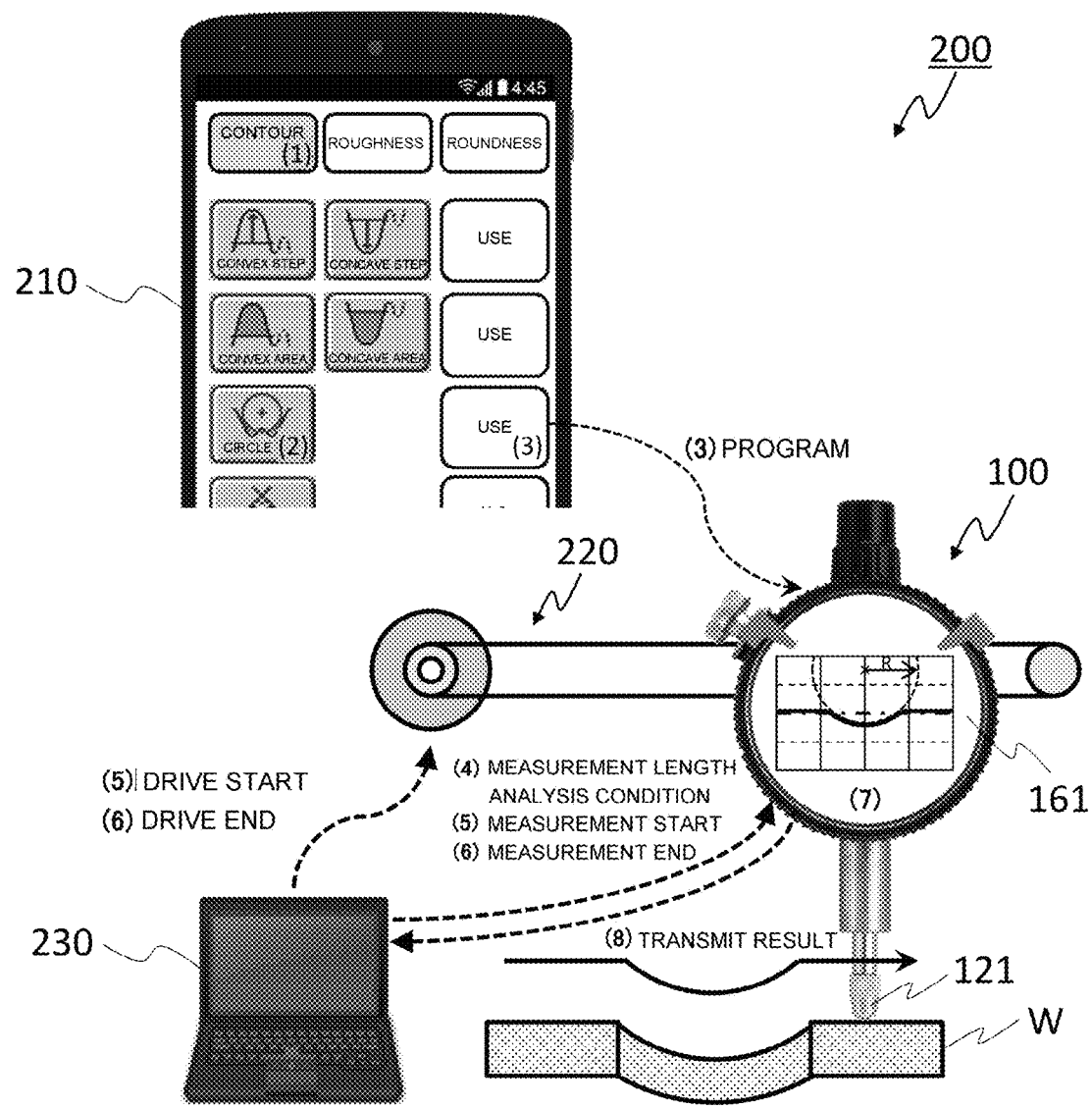
FIG. 9 is a diagram showing an example of a configuration of a measuring system 200.

An example of a measuring system 200 that uses the measuring device 100 in a form in which a program is acquired from an external device will be described with reference to FIG. 9.

The measuring system 200 includes a measuring device 100 of the present invention further including a CPU and a communication unit, a smartphone 210 as an external device, a driver 220 that moves the measuring device 100 such that the measuring element 121 slides on the surface of the object to be measured W in a certain direction, and a terminal device 230 such as a PC for controlling the driver 220. Information can be transmitted and received between the measuring device 100 and the smartphone 210 and the terminal device 230 by an arbitrary communication method.

In the smartphone 210, a program corresponding to items to be measured by the measuring device 100 is prepared, and a selection menu of items to be measured is displayed on a touch panel display.

Under such a configuration, for example, first, (1) a measurer selects and inputs a contour analysis program from the menu, (2) further selects and inputs a "circle" analysis program of contour analysis, and then (3) selects and inputs "use", and thereby, the contour analysis program is uploaded to the measuring device 100.

Subsequently, (4) a measurement length such as a movement length and a radius and a analysis condition are transmitted from the terminal device 230 to the measuring device 100, and then, (5) a measurement start command is transmitted from the terminal device 230 simultaneously to the driver 220 and the measuring device 100, so that the measurement is performed.

(6) Then, a measurement end command is transmitted simultaneously from the terminal device 230 to the driver 220 and the measuring device 100, and the measurement is ended. (7) The measurement result is displayed on the display unit 161. (8) The measurement result may be transmitted from the measuring device 100 to the terminal device 230.

Sixth Embodiment

When the display unit 161 is a display device that can freely draw like a dot matrix liquid crystal display, the display on the display unit 161 may be configured to be switched to the display of the measurement value in the analog format or the digital format by an instruction input from a button, a switch, a touch panel or the like.

Figure 10A:
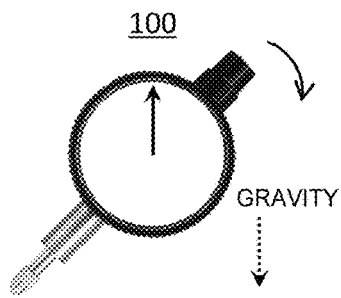
FIGS. 10A to 10F are diagrams showing variations of a display method by a display unit 161.
Figure 10B:
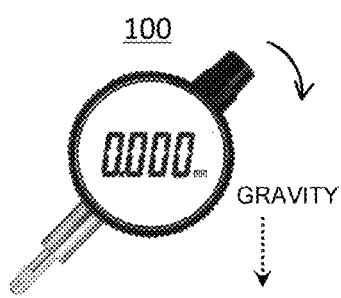

The measuring device 100 may be configured so that, when the measuring device 100 includes a posture detection sensor, and the measuring device 100 is used in an inclined state, in the case of displaying in the analog format, display is performed such that the orientation of a hand indicating a zero position is opposite from the gravity as shown in FIG. 10A, and in the case of displaying in the digital format, display is performed such that the display is horizontal with respect to the gravity as shown in FIG. 10B. In this case, in order to correspond to an arbitrary inclination angle, the shape of the display unit 161 is preferably circular. The measuring device 100 may further has a function of locking the display direction, or a change of the display direction by any manual operation may be made possible.

Figure 10C:
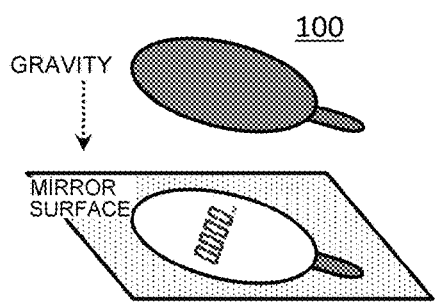

When the measuring device 100 includes a posture detection sensor and the display unit 161 is used in the direction of gravity as shown in FIG. 10C, the display on the display unit 161 may be configured so as to be normally displayed on an opposing mirror surface. In this way, the display in accordance with the posture of use is made possible, so that the display becomes easier to read and workability is improved.

Figure 10D:
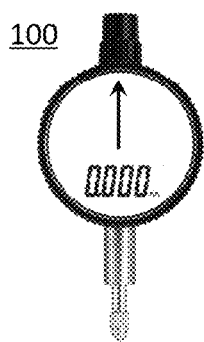
Figure 10E:
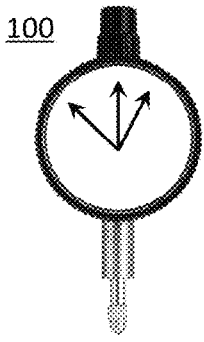
Figure 10F:
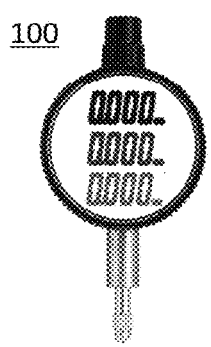

As shown in FIG. 10D, the display in the analog format and the display in the digital format may be performed simultaneously, or as shown in FIGS. 10E and 10F, the maximum value and the minimum value may be displayed together with the measurement value simultaneously.

Seventh Embodiment

Figure 11:
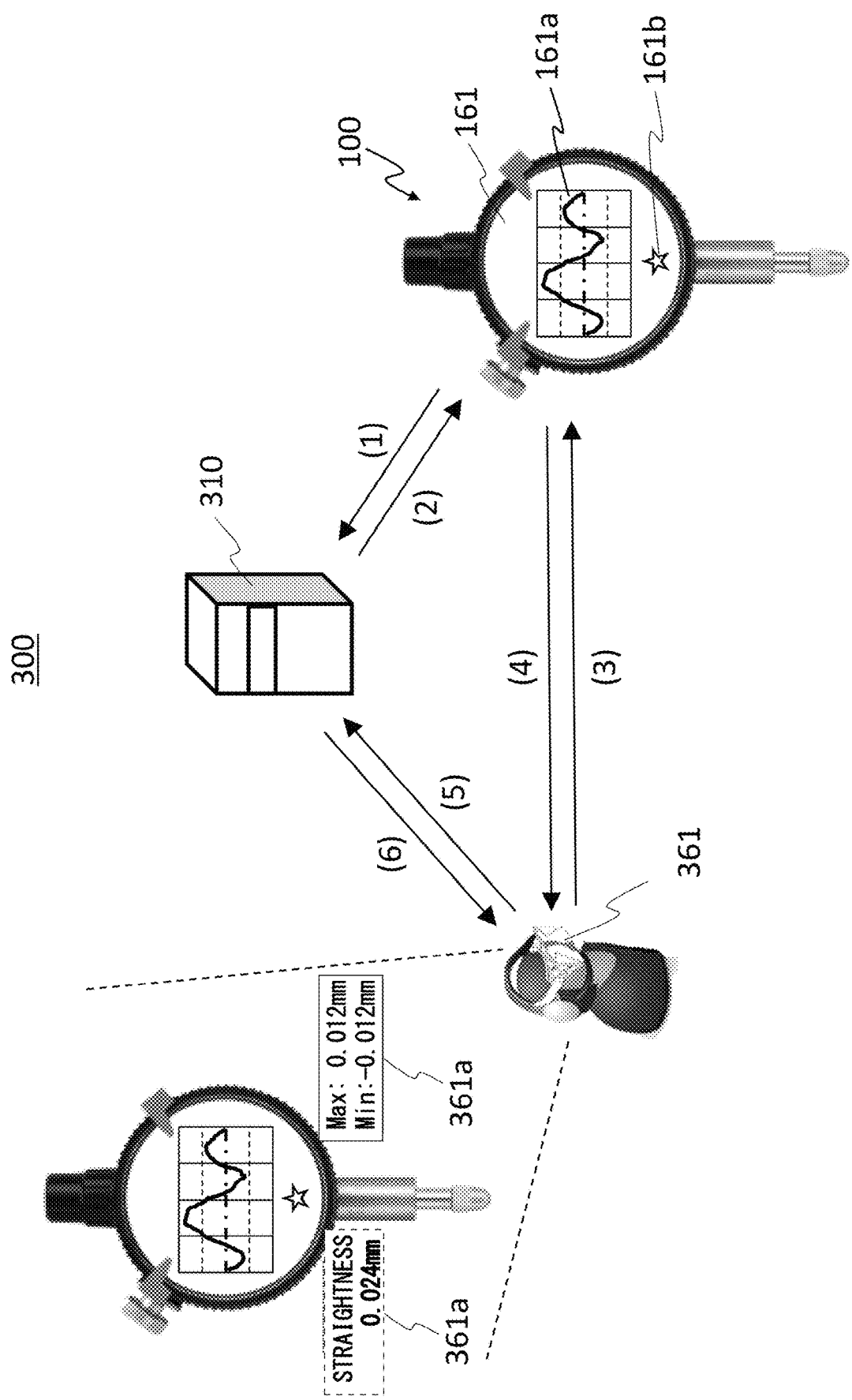
FIG. 11 is a diagram showing an example of a configuration of a measuring system 300.

A measuring system 300 may be configured in the display unit 161 in which an augmented reality device is combined and can be used. FIG. 11 shows an example of a configuration of the measuring system 300. The measuring system 300 includes a measuring device 100, an analysis device 310, and an augmented reality device 361.

Each of the measuring device 100, the analysis device 310, and the augmented reality device 361 includes an arbitrary communication unit (not shown) that can transmit and receive information to and from the counterparty.

The analysis device 310 is a computer, acquires from the measuring device 100, data of the displacement amount for each predetermined cycle collected by the measuring device 100 ((1) in FIG. 11), and performs predetermined analysis to obtain analysis results. For example, the analysis device 310 may be configured as a server provided in a LAN, or may be configured as a cloud server on a WAN.

The measuring device 100 acquires marker information corresponding to an analysis result from the analysis device 310 ((2) in FIG. 11), and causes the display unit 161 to display a marker 161b based on the marker information together with predetermined information 161a (for example, a graph showing the position dependent change of the displacement amount) based on the data of the displacement amount per the predetermined cycle that has been analyzed.

The augmented reality device 361 includes an imaging unit and an augmented reality display unit. When an image including the display unit 161 of the measuring device 100 is captured by the imaging unit ((3) and (4) in FIG. 11), the augmented reality device 361, inquires of the analysis device 310 for the analysis result corresponding to the marker 161b displayed together with the predetermined information 161a on the display unit 161, to acquire the analysis result ((5) and (6) in FIG. 11), and superimposes the analysis result on the image including the display unit 161 of the measuring device 100 captured by the imaging unit to cause the superimposed image to be displayed at a predetermined display position 361a of the augmented reality display unit. The predetermined display position 361a may be set to the position where the display unit 161 is displayed, or may be set outside the position where the display unit 161 is displayed as shown in FIG. 11.

Note that a configuration may be adopted such that a plurality of different pieces of analysis are performed in the analysis device 310, the measuring device 100 acquires a plurality pieces of marker information corresponding to each analysis result from the analysis device 310, each marker 161b is sequentially displayed on the display unit 161 while being switched at an arbitrary time interval automatically or by manual operation by a user, and the augmented reality device 361 causes the augmented reality display unit to sequentially perform superimposing display of the analysis results corresponding to each marker 161b in response to switching of the marker 161b. For example, the sequential superimposing display may be switched and displayed at one display position 361a, or may be additionally displayed in a different display position 361a.

A plurality of analysis results may be displayed simultaneously on the augmented reality display unit in a way in which one marker 161b is assigned to a plurality of analysis results and the marker 161b is captured by the imaging unit of the augmented reality device 361.

The marker 161b may be replaced with the display of the predetermined information 161a. In this case, for example, the analysis device 310 acquires and analyzes the displacement amount data for each predetermined cycle from the measuring device 100, and acquires the display image data of the predetermined information 161a corresponding to the data, or acquires and analyzes the displacement amount data for each predetermined cycle from the measuring device 100, and generates display image data of predetermined information 161a corresponding to the data by the measuring device 100 itself. As a result, the augmented reality device 361 can acquire the analysis result to be displayed on the augmented reality display unit by inquiring of the analysis device 310 for the analysis result corresponding to the display of the predetermined information 161a captured by the imaging unit.

According to the measuring system 300 described above, variations in the display method of the measurement result can be increased. Since the analysis device 310 is responsible for the analysis function, more flexible and advanced analysis can be performed than in a case where the measuring device 100 itself has an analysis function.

Eighth Embodiment

Figure 12:
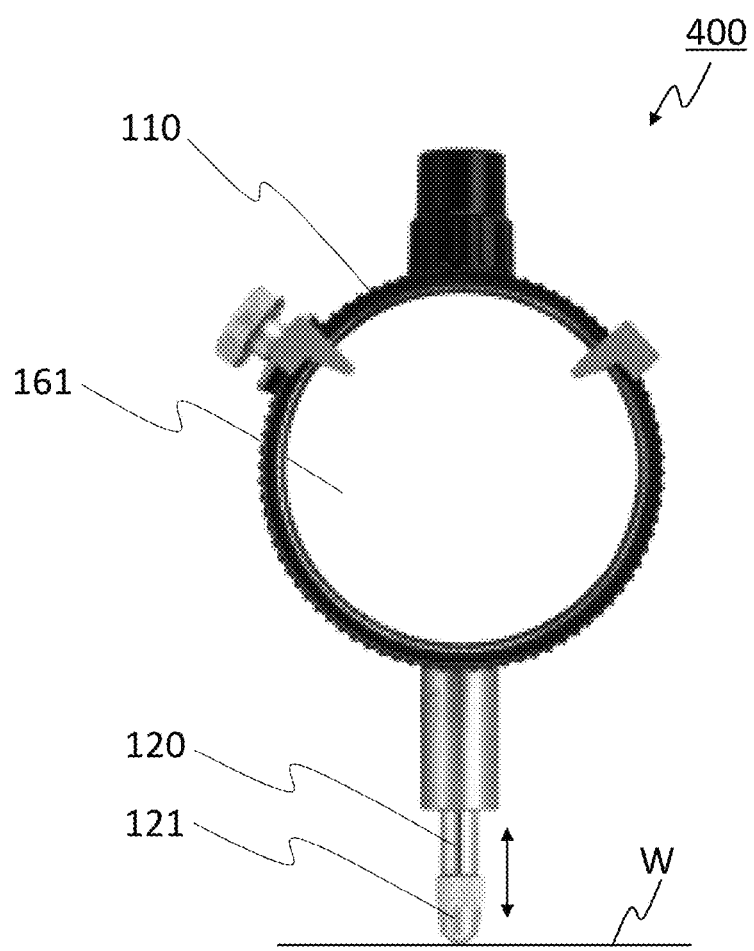
FIG. 12 is a diagram showing an example of appearance of a measuring device 400.
Figure 13:
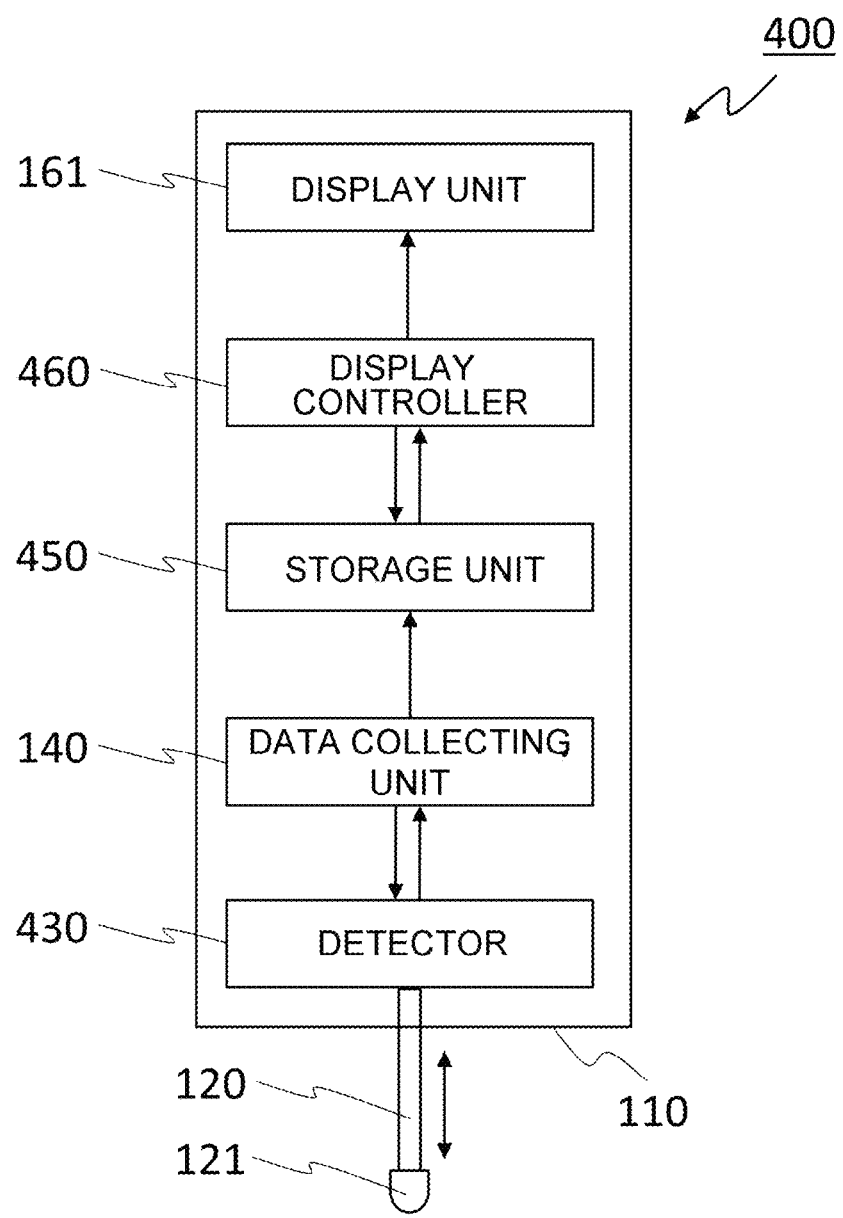
FIG. 13 is a functional block diagram of the measuring device 400.

FIG. 12 shows an example of appearance of a measuring device 400 of the present invention, and FIG. 13 shows a functional block diagram of the measuring device 400 of the present invention. The measuring device 400 includes the main body case 110, the spindle 120, the measuring element 121, a detector 430, the data collecting unit 140, a storage unit 450, a display controller 460, and the display unit 161.

The detector 430 detects the displacement amount of the spindle 120 in a process in which the measuring element 121 slides in a certain direction relative to an inspection target section of the object to be measured W. An arbitrary method, such as a photoelectric type, a capacitive type, an electromagnetic type or the like, may be adopted as the detection method of the displacement amount as long as the displacement amount can be output as an electric signal.

The measurement data of the displacement amount for each predetermined cycle in the first measurement performed beforehand in order to grasp the entire shape of the inspection target section is stored in advance in the storage unit 450.

When performing the second measurement in the inspection target section, the display controller 460 refers to the storage unit 450, and causes the display unit 161 to display a graph showing the position dependent change of the displacement amount in the inspection target section according to the first measurement, the display unit 161 capable of performing the graphic display. In the graph, a position in a measurement path having the same displacement amount as the displacement amount acquired in the second measurement is searched and displayed on the display unit 161 in a predetermined manner.

For example, when the end point of the first measurement is the start point of the second measurement, each time the displacement amount in the second measurement is acquired for each predetermined cycle, the position in the inspection target section is searched from a start point that is a specified position in a previous cycle, to the start point of the first measurement in the graph, and the searched position is displayed in a predetermined manner. When the start point of the first measurement is the start point of the second measurement, each time the displacement amount in the second measurement is acquired for each predetermined cycle, the position in the inspection target section is searched from a start point that is a specified position in a previous cycle, to the end point of the first measurement in the graph, and the searched position is displayed in a predetermined manner.

The position specified by the search is the current position of the measuring element 121 in the measurement path. Display may be performed with an arbitrary display manner as long as this current position can be read on the graph displayed on the display unit 161.

The function of the display controller 460 can be realized, for example, in a way in which the measuring device 400 includes the CPU and the CPU executes a program in which the function of the display controller 460 is described. In this case, advanced processing and analysis can be performed in accordance with the description contents of the program, and a result can be reflected on the display on the display unit 161.

Figure 14A:
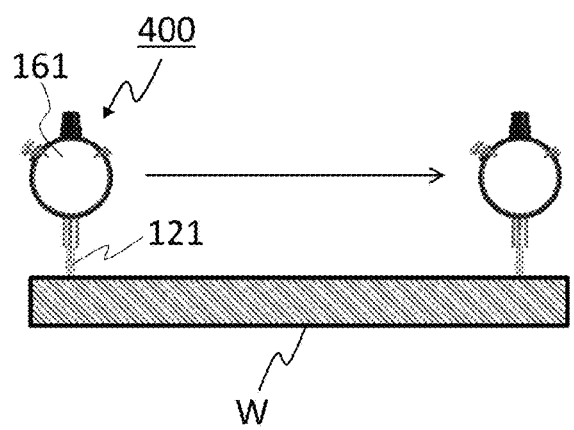
FIGS. 14A and 14B are diagrams for explaining a specific example of an eighth embodiment.

A specific example of the embodiment will be described with reference to FIGS. 14A, 14B, 15A, 15B, 16A, and 16B. First, as shown in FIG. 14A, the measuring element 121 of the measuring device 400 is slid on the object to be measured W in a certain direction (from the left side to the right side in the drawing), the first measurement is performed in which the displacement amount of the measuring element 121 in the inspection target section is acquired for each predetermined cycle by the data collecting unit 140, and the measurement data is stored in the storage unit 450.

Figure 14B:
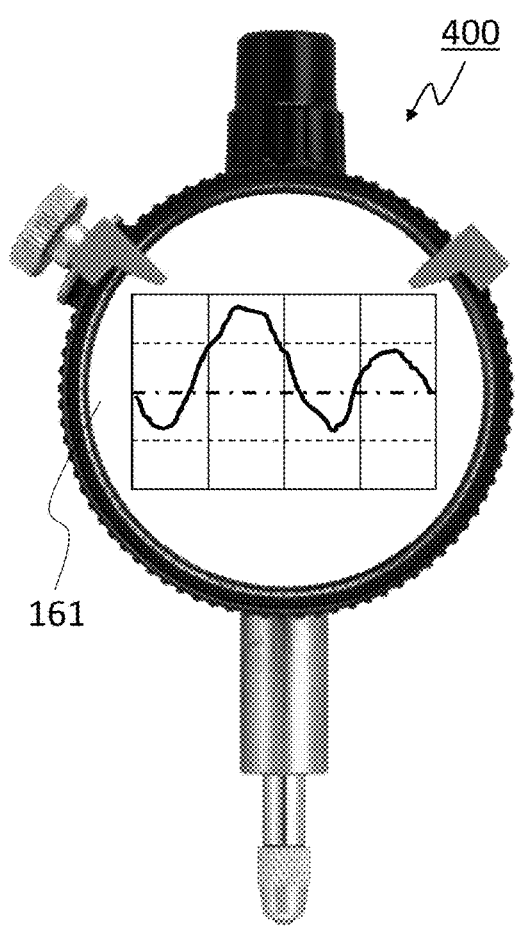

The display controller 460 refers to the storage unit 450, and for example, as shown in FIG. 14B, causes the display unit 161 to display a graph showing the position dependent change of the displacement amount. In the graph of FIG. 14B, the vertical axis represents the displacement amount, the horizontal axis represents the position, the measurement start point is the left end, and the end point is the right end.

Figure 15A:
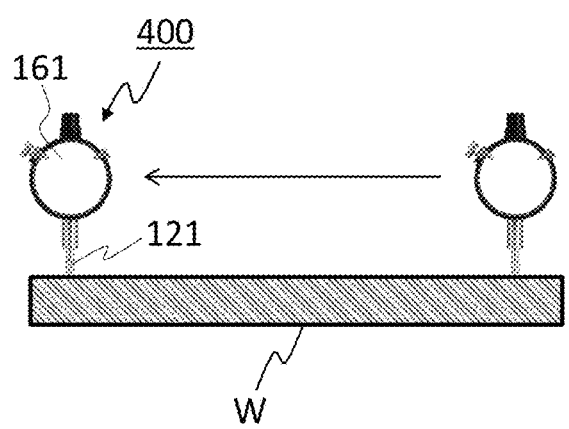
FIGS. 15A and 15B are diagrams for explaining a specific example of the eighth embodiment.
Figure 15B:
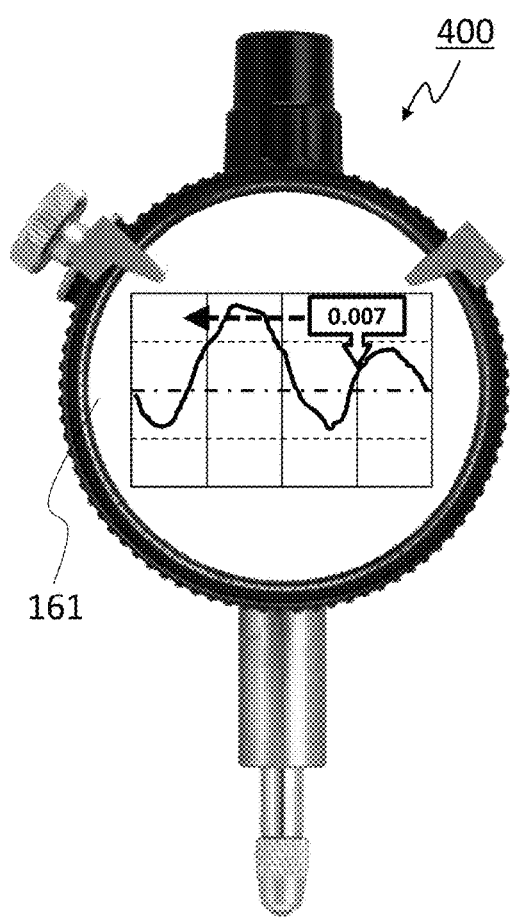

Subsequently, in a state where the graph related to the first measurement is displayed, as shown in FIG. 15A, the measuring element 121 of the measuring device 400 is slid from the end point to the start point of the first measurement in the inspection target section, and the second measurement is performed in which the displacement amount of the measuring element 121 is acquired for each predetermined cycle by the data collecting unit 140. At this time, the display controller 460 searches the position in the inspection target section from the start point that is the position specified in the previous cycle to the left end of the graph each time the displacement amount is acquired for each predetermined cycle, and causes the position to be displayed in a predetermined manner. FIG. 15B shows an example of a manner in which a searched position is indicated by an arrow on a graph. Indication may be performed only by an arrow, or may be performed together with the displacement amount at that position as shown in FIG. 15B.

Figure 16A:
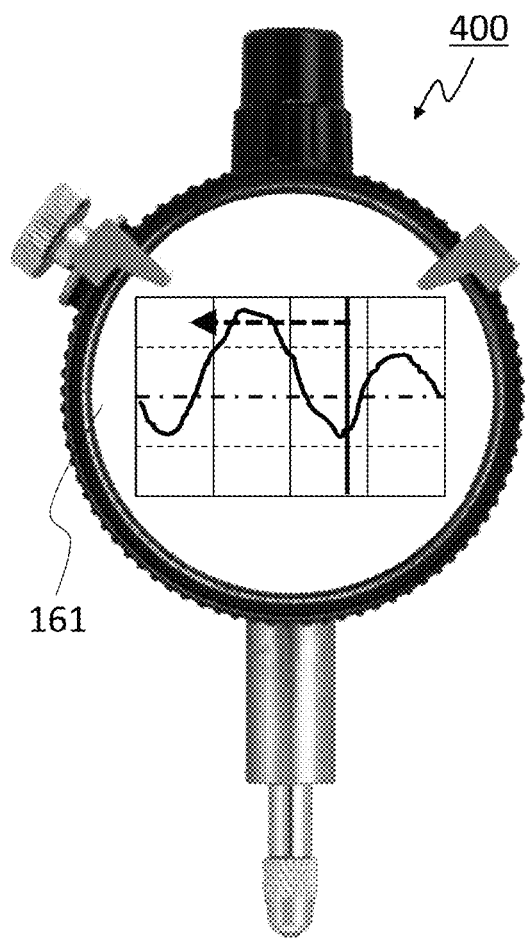
FIGS. 16A and 16B are diagrams showing variations of a display manner of a current position related to the specific example of the eighth embodiment.
Figure 16B:
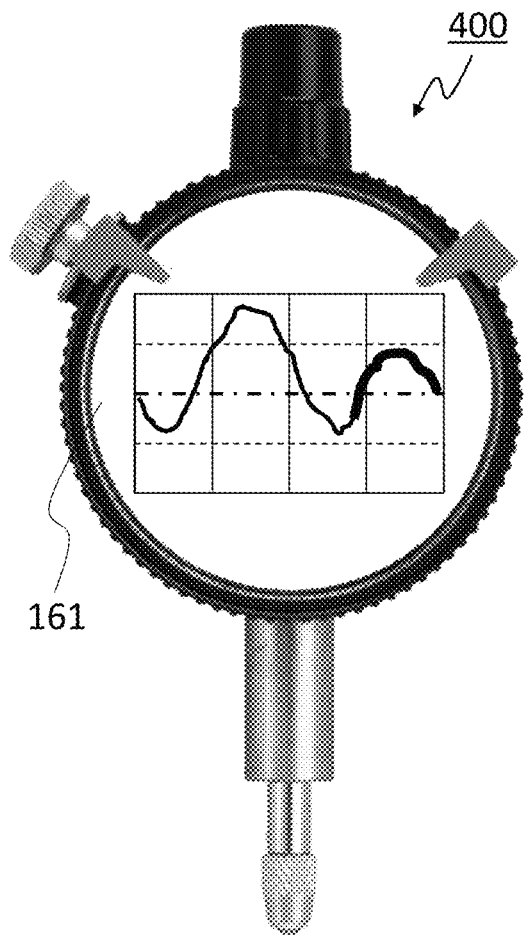

Regarding the display manner of the current position, in a manner other than the manner shown in FIG. 15B, for example, as shown in FIG. 16A, there are a manner in which indication is performed with a vertical line, or a manner in which indication is performed in a form of tracing the second measurement result in a graph related to the first measurement with a thick line or a line changed in color, as shown in FIG. 16B, and the like.

Ninth Embodiment

Figure 17:
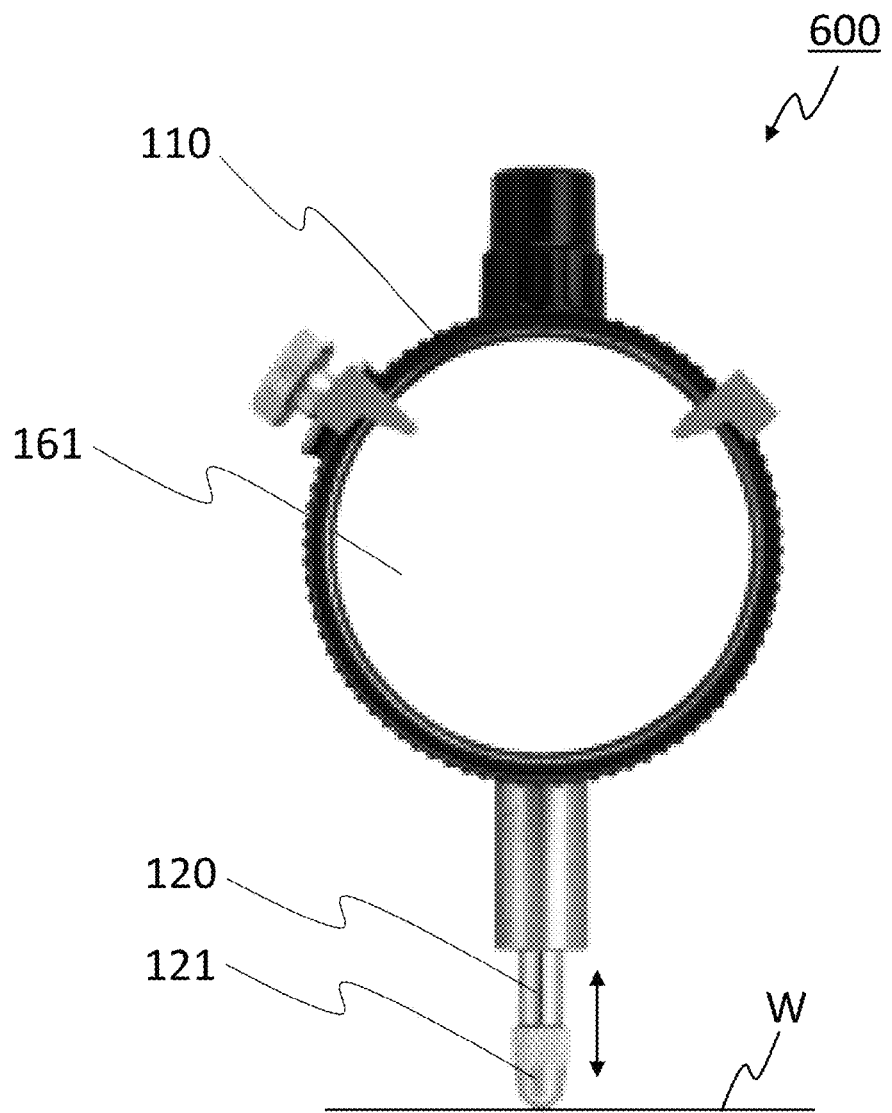
FIG. 17 is a diagram showing an example of appearance of a measuring unit 600.
Figure 18:
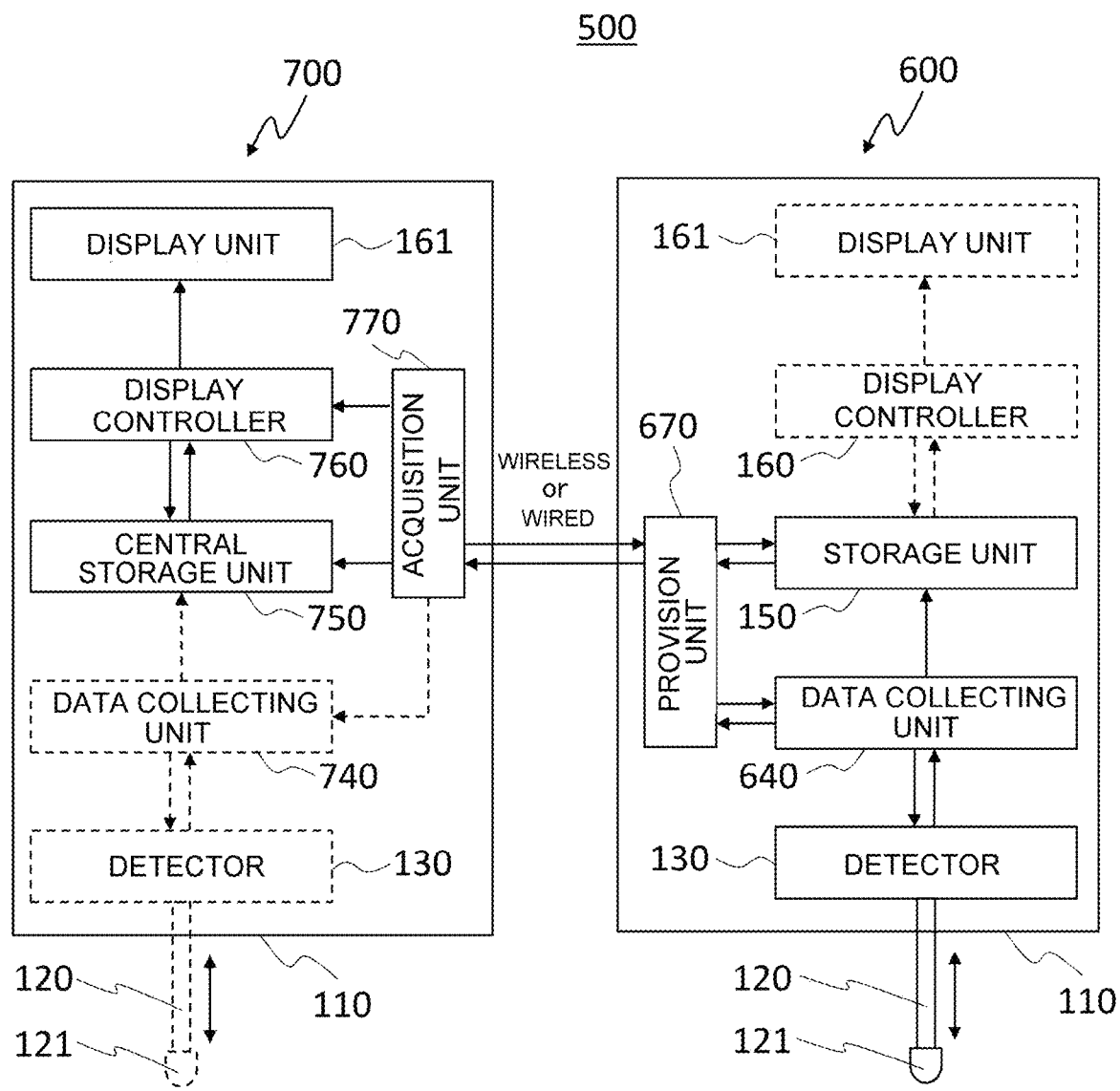
FIG. 18 is a functional block diagram of a measuring device 500.

A measuring device 500 of the present invention includes a plurality of measuring units 600 and a central unit 700. FIG. 17 shows an example of appearance of the measuring unit 600, and FIG. 18 shows a functional block diagram of the measuring device 500.

The measuring unit 600 includes the main body case 110, the spindle 120, the measuring element 121, the detector 130, a data collecting unit 640, the storage unit 150, a provision unit 670, the display controller 160, and the display unit 161. However, the display controller 160 and the display unit 161 may be omitted if a measurement result is not displayed in the measuring unit 600.

At the trigger of the reception of the measurement start instruction from the central unit 700, the data collecting unit 640 starts acquiring the displacement amount detected by the detector 130 in a predetermined cycle, and writing the displacement amount in the storage unit 150 as an arbitrary storage unit. Then, at the trigger of the reception of the measurement end instruction, the data collecting unit 640 ends the processing.

The provision unit 670 has an arbitrary communication function capable of transmitting and receiving information to and from the central unit 700, and transmits a measurement result of the displacement amount for each cycle stored in the storage unit 150 to the central unit 700 at the trigger of the reception of the measurement result transmission instruction from the central unit 700.

Note that the communication connection between the central unit 700 and each of the plurality of measuring units 600 may be made by, instead of a method of star connection with the central unit 700, a method of daisy-chain connecting the plurality of measuring units 600. In that case, a communication function corresponding to daisy chain connection may be included. Adopting the daisy chain connection has an advantage that, although it takes a little time to set up each measuring unit 600, the distance between the central unit 700 and the measuring unit 600, which is not the nearest to the central unit 700, can be made longer than that in the star connection.

The central unit 700 includes a central storage unit 750, an acquisition unit 770, a display controller 760, and a display unit 161.

The acquisition unit 770 has an arbitrary communication function capable of transmitting and receiving information to and from each measuring unit 600, and transmits a measurement start instruction and a measurement end instruction to each measuring unit 600 so that each measuring unit 600 performs measurement in synchronization. After the transmission of the measurement end instruction, the measurement result transmission instruction is transmitted to each measuring unit 600, and the measurement result is received from each measuring unit 600 and stored in the central storage unit 750 which is an arbitrary storage unit.

The display controller 760 may cause the display unit 161 to display predetermined information based on the measurement results of the measuring units 600.

The function of the display controller 760 can be realized, for example, in a way in which the central unit 700 includes the CPU and the CPU executes a program in which the function of the display controller 760 is described. In this case, advanced processing and analysis can be performed in accordance with the description contents of the program, and a result can be reflected on the display on the display unit 161. At this time, a display capable of graphic displaying is adopted as the display unit 161, it is possible to greatly increase the flexibility of the display manner of the measurement result and the analysis result.

As the predetermined information to be displayed on the display unit 161 may be, for example, information in which the position dependent change of the displacement amount is graphed for each measuring unit 600 and each graph may be superimposed, or aggregate information of the measurement result by each measuring unit 600.

The content of this aggregate information is arbitrary and may be, for example, flatness, roundness, cylinder degree, coaxiality, concentricity, or the like obtained by analyzing the measurement result of each measuring unit 600, or, in addition, may be aggregation of the measurement results by the measuring units 600 by some rule.

The central unit 700 may be integrated with the measuring unit 600. In this case, as shown in FIG. 17, the central unit 700 should be configured so that the measuring unit 600 further includes the spindle 120 provided so as to be displaced in the axial direction in the main body case 110 of the central unit 700 and having the measuring element 121 in a tip end, the detector 130, and the data collecting unit 740, and the data collecting unit 740 starts and ends the measurement in synchronization with the measuring unit 600 in accordance with an instruction from the acquisition unit 770 and causes the central storage unit 750 to store the measurement result. In the function of the measuring unit 600 of the central unit 700, when it is desired to display its own measurement result on the display unit 161, the display controller 760 should be configured to function as similar to the display controller 160 at the time of measurement.

Figure 19:
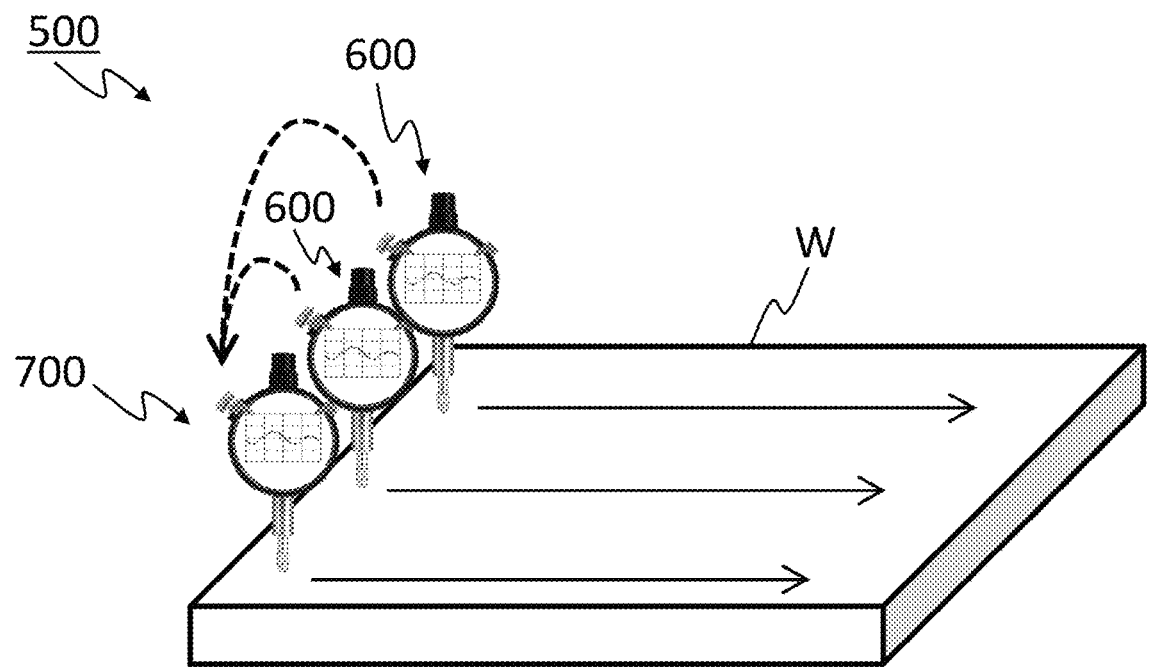
FIG. 19 is a diagram showing an example of measurement for grasping the flatness of the object to be measured W by the measuring device 500.

FIG. 19 is a diagram showing an example of a case where the central unit 700 has a function of the measuring unit 600, substantially three measuring units 600, that is, the function and two measuring units 600, compose the measuring device 500 of the present invention, and the flatness of the object to be measured W is measured. In the configuration of FIG. 19, three measuring devices are fixed to a stand (not shown) or the like and simultaneously moved in the right direction of the drawing so that each measurement result is obtained. In each measuring unit 600 of FIG. 19, a case is shown in which the measurement result at this time point is displayed on the display unit 161 in a graph. Then, the measurement results of the two measuring units 600 are transmitted to the central unit 700, and analyzed by the display controller 760 together with the measurement result by the function of the measuring unit 600 of the central unit 700, and the analysis result is displayed on the display unit 161.

Figure 20:
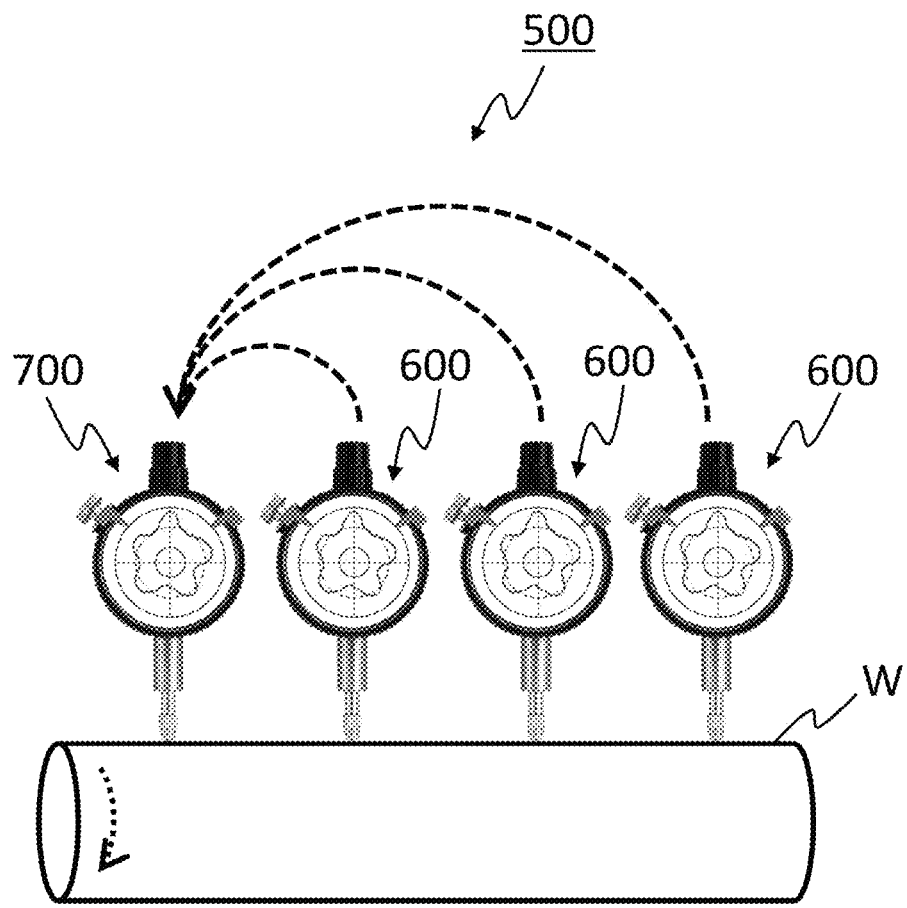
FIG. 20 is a diagram showing an example of measurement for grasping the roundness of the object to be measured W by the measuring device 500.

FIG. 20 is a diagram showing an example of a case where the central unit 700 has a function of the measuring unit 600, substantially four measuring units 600, that is, the function and three measuring units 600 compose the measuring device 500 of the present invention, and the cylindrical degree of the object to be measured W is measured. In the configuration of FIG. 20, four measuring devices are fixed to a stand (not shown) or the like and a cylinder is rotated around an axis relatively with respect to each measuring unit 600 so that each measurement result is obtained. In each measuring unit 600 of FIG. 20, a case is shown in which the measurement result at this time point is displayed on the display unit 161 in a graph. Then, the measurement results of the three measuring units 600 are transmitted to the central unit 700, and analyzed by the display controller 760 together with the measurement result by the function of the measuring unit 600 of the central unit 700, and the analysis result is displayed on the display unit 161.

Figure 21:
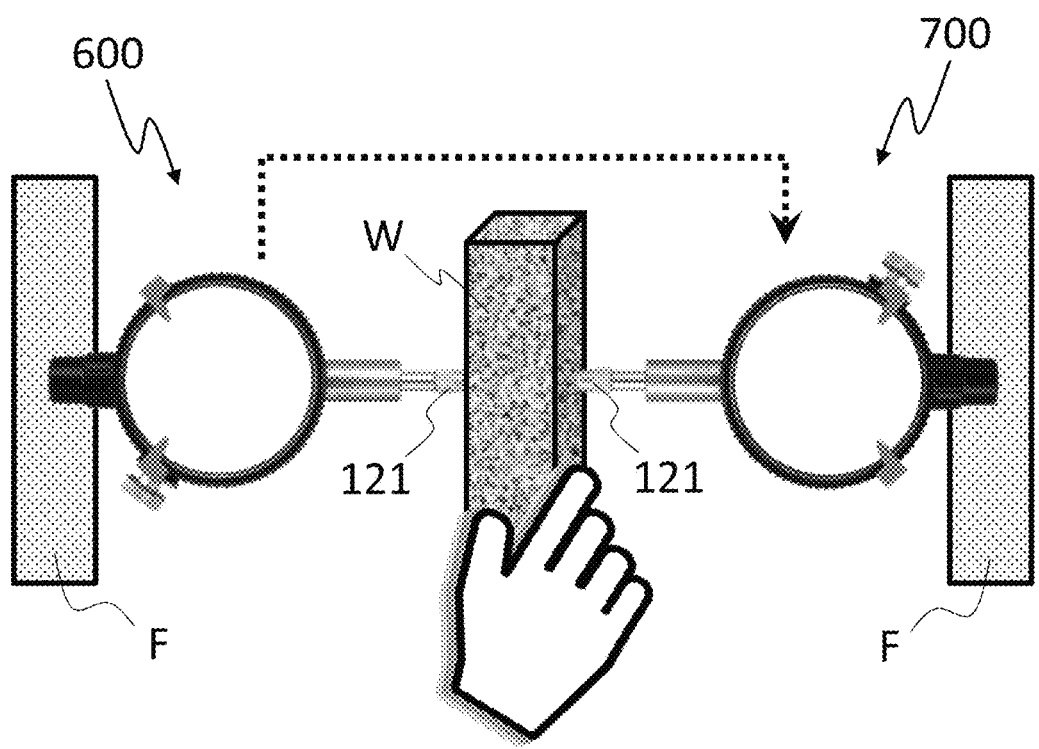
FIG. 21 is a diagram showing an example of measurement of the dimension of the object to be measured W by the measuring device 500.

FIG. 21 is a diagram showing an example of a case where the central unit 700 has a function of the measuring unit 600, substantially two measuring units 600, that is, the function and one measuring unit 600 compose the measuring device 500 of the present invention, and the dimension of the object to be measured W is measured. In the configuration of FIG. 21, substantially two measuring units 600 are fixed to a fixture F so that measuring elements 121 are arranged with a predetermined gap, and a protrusion state of the spindle 120 is adjusted. In this state, the object to be measured W is inserted to between the two measuring elements 121, and the measurement results of the two measuring units 600 are obtained. Then, the measurement result of the one measuring unit 600 is transmitted to the central unit 700, the dimension is calculated by the display controller 760 together with the measurement result by the function of the measuring unit 600 of the central unit 700, and the calculation result is displayed on the display unit 161. According to this configuration, since the dimension can be measured only by inserting the object to be measured W to between the measuring elements 121, measuring instruments such as calipers and micrometers do not need to be held in the hand.

According to the measuring device 500 of the ninth embodiment described above, there is no need to gaze at the trend of the displacement amount displayed on the plurality of measuring units 600, and a plurality of pieces of measurement data can be promptly obtained by one measurement, so that the measurement time can be shortened. In addition, measurement can be easily performed. When the central unit 700 is arranged at a position where the display unit 161 is easy to see, flexibility of placement is high since the placement state of the measuring unit 600 is irrelevant. In addition, grasping of trends of the measurement results collected from each measuring unit 600 and various analysis are performed in the display controller 760, and the result can be displayed.

Tenth Embodiment

Figure 22A:
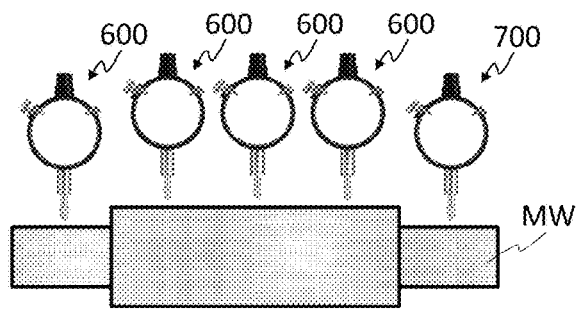
FIGS. 22A to 22D are diagrams showing an example of measurement of a master workpiece.
Figure 22B:
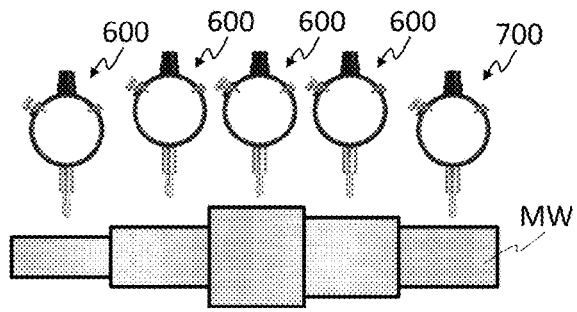
Figure 22C:
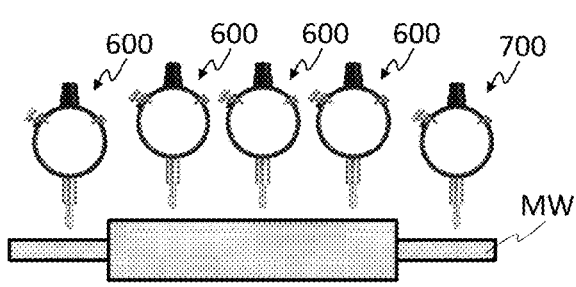
Figure 22D:
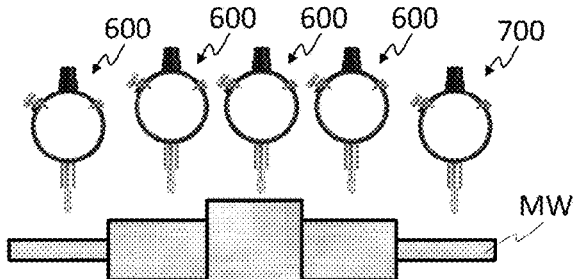
Figure 22E:
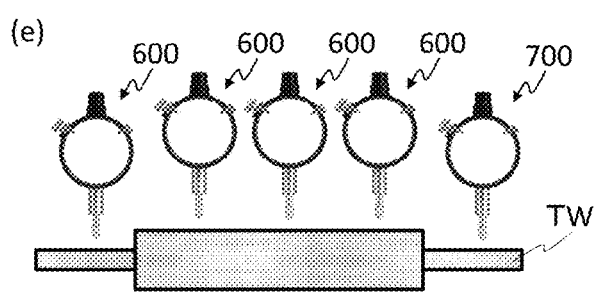
FIG. 22E is a diagram showing an example of measurement of an inspection target workpiece.

In the measuring device 500 of the ninth embodiment, aggregate information of the master workpieces MW is stored in advance in the central storage unit 750, the aggregate information being obtained by measuring a plurality of master workpieces MW which are objects to be measured, for example, in a way as shown in FIGS. 22A to 22D. Then, the display controller 760 may compare the aggregate information obtained by measuring the inspection target workpiece TW being an object to be measured, for example, as shown in FIG. 22E, with the aggregate information of master workpieces MW stored in the central storage unit 750 with predetermined similarity as a scale, so that a master workpiece MW most similar to the inspection target workpiece TW is specified from among a plurality of (four in an example shown in FIGS. 22A to 22E) master workpieces MW, and arbitrary information indicating the specified master workpiece MW may be displayed on the display unit 161 in an arbitrary form.

As a result, when each reference object to be measured is representative of the type of the object to be measured, according to the present invention, it is possible to easily specify which type has the highest possibility of being a type to which the object to be measured belongs.

Eleventh Embodiment

Figure 23:
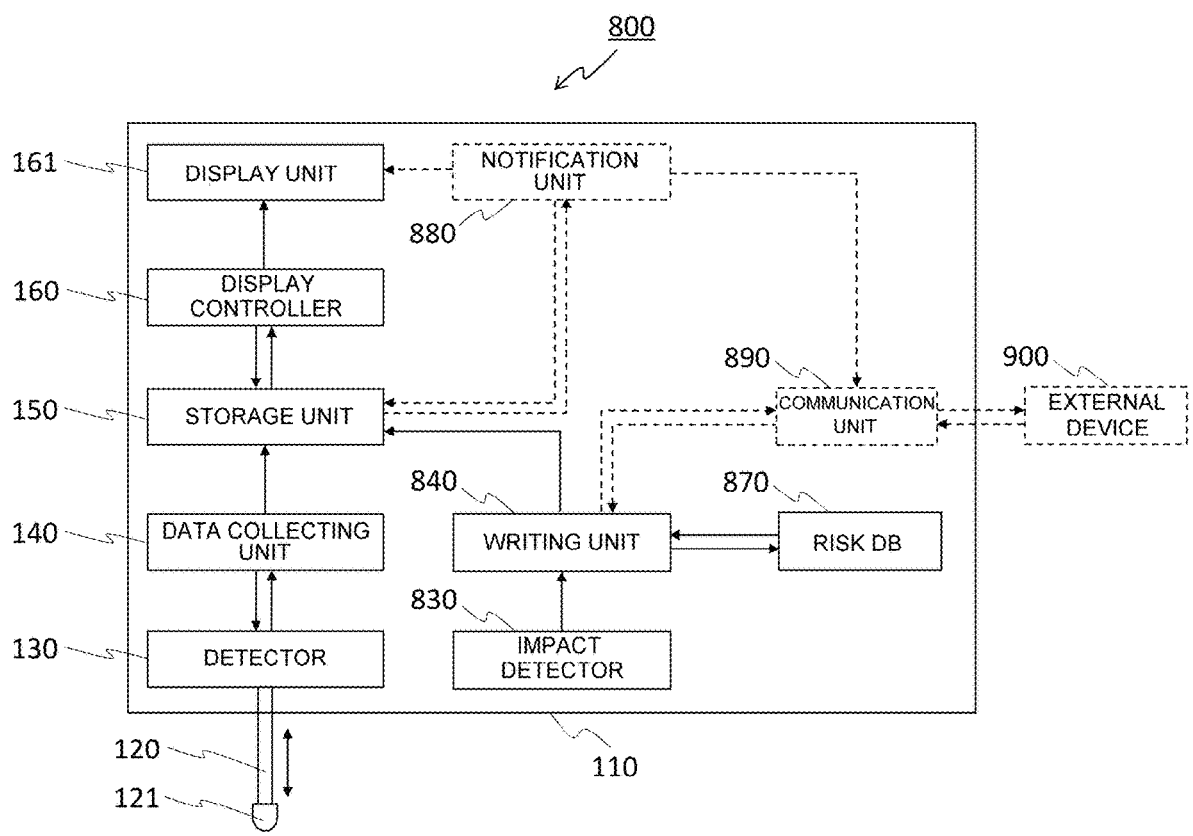
FIG. 23 is a diagram showing an example of a functional configuration of a measuring device 800.

FIG. 23 is a diagram showing an example of a functional configuration of a measuring device 800 of the present invention. The measuring device 800 includes the main body case 110, the spindle 120, the measuring element 121, the detector 130, the data collecting unit 140, the storage unit 150, the display controller 160, the display unit 161, an impact detector 830, and a writing unit 840.

The impact detector 830 is a sensor for detecting impact. The content of the impact to be detected is, for example, the strength of impact or the direction of impact. The posture upon receiving the impact may also be detected. The type and the number of sensors to be employed may be arbitrarily determined in accordance with the content of the impact to be detected or the like. Examples of sensors to be employed for detecting impact and posture include an acceleration sensor, a gyro sensor, or the like.

The writing unit 840 writes the content of the impact into the arbitrary storage unit 150 together with the detection time each time the impact detector 830 detects the impact.

With such a configuration, the content of the impact is stored in the storage unit and remained as a history each time an impact is applied to the measuring device. Therefore, the user can grasp the history information by referring to the storage unit 150 by an arbitrary method. For example, the measuring device 800 may have a function of reading out history information from the storage unit 150 and causing an arbitrary display unit to display the history information at the trigger of predetermined operation by the user.

The measuring device 800 may further include a risk database 870 stored with a relationship between the content of the impact and a predetermined risk value indicating the magnitude of the risk of occurrence of an abnormality. When the content of the impact detected by the impact detector 830 is written in the storage unit 150, the writing unit 840 may refer to the risk database 870 and write the content together with a risk value corresponding to the content of the impact detected by the impact detector 830.

This allows the user refer to the storage unit 150 by an arbitrary method to grasp the risk due to the impact that the measuring device 800 has temporarily or cumulatively received.

For the presentation of a risk to a user, instead of a form in which the user directly refers to the storage unit 150, for example, the measuring device 800 may further include a notification unit 880 that refers to the storage unit 150 at a predetermined timing, and when the risk value corresponding to the impact detected by the impact detector 830 exceeds a predetermined threshold, outputs predetermined warning information, and the display unit 161 may be configured to display the warning information output by the notification unit 880 in a predetermined form. In this case, the trigger for the notification unit 880 to output the predetermined warning information may be, for example, when the accumulation of the risk values corresponding to each impact detected by the impact detector 830 exceeds a predetermined threshold, or when the number of times of impact detected by the impact detector 830 exceeds a predetermined threshold.

Examples of a predetermined opportunity when the notification unit 880 refers to the storage unit 150 include, for example, the timing at which the impact detector 830 detects the impact and the impact history is updated in the storage unit 150, an arbitrary cycle, or the like.

The warning information output by the notification unit 880 corresponds to the form of the information displayed on the display unit 161. As the form of displaying the warning information on the display unit 161, an arbitrary form may be adopted such as letters, sounds, lights, vibrations or the like, and specific display unit such as a display, a speaker, a lamp, a vibrator or the like may be selected in accordance with the adopted form.

With the configuration including the notification unit 880, since a warning is issued to the user in accordance with the set degree of risk, it is possible for the user to easily grasp the abnormality and cope with the abnormality promptly.

The display unit 161 may be provided outside the measuring device 800. For example, the measuring device 800 may include an arbitrary communication unit 890 that can communicate with an arbitrary external device 900 having a display unit, and the notification unit 880 may provide predetermined warning information to the display unit of the external device 900 via the communication unit 890.

As a result, even when the measuring device 800 is used by remote control, for example, the warning information can be promptly provided to the user.

The risk database 870 may also be provided outside the measuring device 800. For example, the measuring device 800 may include an arbitrary communication unit 890 that can communicate with an arbitrary external device 900 having a display unit, and the writing unit 840 may transmit and receive information to and from the risk database 870 via the communication unit 890.

As a result, the risk database 870 can be shared by a plurality of measuring devices 800, and there is no need to update the risk database 870 for each measuring device 800.

FIGS. 24A and 24B show an example of a specific embodiment of a case where the present invention is applied to a dial gauge. In this example, a display capable of graphic displaying is adopted as the display unit 161 of the dial gauge which is the measuring device 800. In the measuring device 800, when a risk value of each time exceeds 4, the notification unit 880 outputs the warning information, and FIG. 24A shows an example in which, since the risk value of the sixth impact is 5, notification of the necessity of inspection, and impact data are output as warning information and displayed graphically on the display unit 161. The impact data includes the detection timing for each impact detection opportunity, the strength of impact and the risk value. The contents displayed on the display unit 161 may be displayed on the display of the external device 900, for example, a smartphone, by providing warning information using wireless communication. In the measuring device 800, in the case where the impact direction as well as the intensity of the impact is also detected as the contents of the impact, by the impact detector 830 and stored in the storage unit 150, predetermined operation for the measuring device 800, for example, operation of selecting a display portion of the risk value displayed on the display unit 161 may be performed so that the impact direction can be graphically displayed as shown in FIG. 24B.

The present invention is not limited to the above embodiments. Each of the embodiments is an example, and anything having substantially the same configuration as the technical idea described in the claims of the present invention and exhibiting the similar operational effect is included in the technical scope of the present invention. That is, it is possible to appropriately change within the scope of the technical idea expressed in the present invention, and a mode to which such modifications and improvements are added is also included in the technical scope of the present invention.

What is claimed is:

1. A measuring device comprising:
 a measuring element that contacts with an object to be measured;
 a detector that detects a displacement amount of the measuring element in a process in which the measuring element slides relatively in a certain direction on a surface of the object to be measured during time from a measurement start to a measurement end;
 a storage unit;
 a data collecting unit that acquires the displacement amount detected by the detector in a predetermined cycle, and causes the storage unit to successively store the displacement amount;
 a display unit that can perform graphical displaying;
 a display controller that causes the display unit to display predetermined information based on the displacement amount for each predetermined cycle;
 an impact detector that detects impact; and
 a writing unit that writes a content of the impact together with a detection timing into the storage unit each time the impact detector detects impact.

2. The measuring device according to claim 1, wherein
 the storage unit stores measurement data of plural times considering the displacement amount for each predetermined cycle stored in the storage unit from the measurement start to the measurement end as measurement data of one time,
 the measurement data of plural times is reference measurement data and comparison measurement data to be compared with the reference measurement data, and
 the display controller causes the display unit to display a graph showing a position dependent change of a difference between the reference measurement data and the comparison measurement data.

3. The measuring device according to claim 1, wherein the storage unit stores measurement data of plural times considering the displacement amount for each predetermined cycle stored in the storage unit from the measurement start to the measurement end as measurement data of one time, the measurement data of plural times is plurality of pieces of reference measurement data being measurement data for each of a plurality of reference objects to be measured and comparison measurement data being measurement data of an object to be measured to be compared with each reference object to be measured, and the display controller compares a position dependent change in a displacement amount in the comparison measurement data and a position dependent change in a displacement amount in each piece of the reference measurement data with predetermined similarity as a scale to specify the reference object to be measured to which the object to be measured is most similar, and causes the display unit to display information indicating the specified reference object to be measured.

4. The measuring device according to claim 1, wherein the display unit is a touch panel display, and the measurement start and the measurement end are performed by a touch input to the touch panel display.

5. The measuring device according to claim 1, wherein the measuring device is a spindle type dial gauge or a lever type dial gauge.

6. The measuring device according to claim 1, wherein wherein the display controller causes the display unit to display the displacement amount for each of the predetermined cycle in a format of a graph showing a position dependent change of the displacement amount, the detector detects the displacement amount of the measuring element in an inspection target section of the object to be measured, the storage unit stores in advance the displacement amount for each predetermined cycle in first measurement preliminarily performed in the inspection target section, and when second measurement in the inspection target section is performed, the display controller refers to the storage unit to cause the display unit to display a graph showing a position dependent change of the displacement amount in the inspection target section related to the first measurement, and searches a position in the inspection target section that has the same displacement amount as the displacement amount acquired by the second measurement in the graph to cause the display unit to display the position in a predetermined manner.

7. The measuring device according to claim 6, wherein when an end point of the first measurement is a start point of the second measurement, the display controller searches a position in the inspection target section every time the displacement amount in the second measurement is acquired for each predetermined cycle, from a start point that is a specified position in a previous cycle, to a start point of the first measurement in the graph, to cause the display unit to display the position, and when a start point of the first measurement is the start point of the second measurement, the display controller searches a position in the inspection target section every time the displacement amount in the second measurement is acquired for each predetermined cycle, from a start point that is a specified position in a previous cycle, to the end point of the first measurement in the graph, to cause the display unit to display the position.

8. The measuring device according to claim 1, further comprising a risk database stored with a relationship between the content of the impact and a predetermined risk value indicating the magnitude of a risk of occurrence of an abnormality, and when the content of the impact detected by the impact detector is written in the storage unit, the writing unit refers to the risk database and write the content together with the risk value corresponding to the content of the impact detected by the impact detector.

9. The measuring device according to claim 8, further comprising a notification unit that refers to the storage unit in a predetermined timing, and when the risk value corresponding to the impact detected by the impact detector exceeds a predetermined threshold, outputs predetermined warning information, and the display unit displays the warning information output by the notification unit in a predetermined form.

10. The measuring device according to claim 9, wherein the notification unit outputs predetermined warning information when accumulation of the risk value corresponding to each impact detected by the impact detector exceeds a predetermined threshold.

11. The measuring device according to claim 9, wherein the notification unit outputs predetermined warning information when the number of times of impacts detected by the impact detector exceeds a predetermined threshold.

12. The measuring device according to claim 9, wherein the display unit is provided outside the measuring device, and the notification unit provides the predetermined warning information to the display unit via a predetermined communication unit.

13. The measuring device according to claim 8, wherein the risk database is provided outside the measuring device, and the writing unit transmits and receives information to and from the risk database via a predetermined communication unit.

14. A measuring system comprising:

a measuring device comprising:
   a measuring element that contacts with an object to be measured;
   a detector that detects a displacement amount of the measuring element in a process in which the measuring element slides relatively in a certain direction on a surface of the object to be measured during time from a measurement start to a measurement end;
   a storage unit;
   a data collecting unit that acquires the displacement amount detected by the detector in a predetermined cycle, and causes the storage unit to successively store the displacement amount;
   a display unit that can perform graphical displaying;
   a display controller that causes the display unit to display predetermined information based on the displacement amount for each predetermined cycle;

an analysis device that acquires data of the displacement amount for each predetermined cycle from the measuring device and performs predetermined analysis to obtain an analysis result; and an augmented reality device having an imaging unit and an augmented reality display unit, wherein the measuring device acquires marker information corresponding to the analysis result from the analysis device and causes the display unit to display a marker based on the marker information together with the predetermined information, and when an image including the display unit of the measuring device is captured by the imaging unit, the augmented reality device acquires the analysis result corresponding to the marker displayed together with the predetermined information on the display unit, from the analysis device, and superimpose the analysis result on the image including the display unit of the measuring device captured by the imaging unit to cause the augmented reality display unit to display the superimposed image.

* * * * *